United States Patent
Kang et al.

(10) Patent No.: US 12,181,574 B2
(45) Date of Patent: Dec. 31, 2024

(54) SYSTEM AND METHOD FOR MEASURING DISTANCE USING ACOUSTIC SIGNAL

(71) Applicant: SAMSUNG ELECTRONICS CO., LTD., Suwon-si (KR)

(72) Inventors: Sungchan Kang, Hwaseong-si (KR); Cheheung Kim, Yongin-si (KR); Daehyuk Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 308 days.

(21) Appl. No.: 17/187,097

(22) Filed: Feb. 26, 2021

(65) Prior Publication Data
US 2022/0099828 A1 Mar. 31, 2022

(30) Foreign Application Priority Data
Sep. 25, 2020 (KR) .................. 10-2020-0124622

(51) Int. Cl.
G01S 15/08 (2006.01)
(52) U.S. Cl.
CPC .................... G01S 15/08 (2013.01)
(58) Field of Classification Search
None
See application file for complete search history.

(56) References Cited

U.S. PATENT DOCUMENTS 1,593,972 A * 7/1926 Hayes .............. G01S 1/72
181/124
2,411,872 A * 12/1946 Carl .............. H01Q 13/28
333/100

(Continued)

FOREIGN PATENT DOCUMENTS

EP 0248172 A2 * 11/1987
EP 2 986 024 A1 2/2016

(Continued)

OTHER PUBLICATIONS

Lewis, Jerad. "Microphone array beamforming." Analog Devices, AN1140 (2012). (Year: 2012).*

(Continued)

*Primary Examiner* — Luke D Ratcliffe
*Assistant Examiner* — Jonathan D Armstrong
(74) *Attorney, Agent, or Firm* — Sughrue Mion, PLLC

(57) ABSTRACT

Provided is a distance measurement system, including: at least one sound source configured to generate an acoustic signal; an acoustic sensor including a plurality of directional acoustic sensors arranged to have directionalities different from one another; and at least one processor configured to: obtain a directionality of the acoustic signal in a particular direction based on at least one of a sum of output signals of the plurality of directional acoustic sensors or a difference between the output signals of the plurality of directional acoustic sensors, the at least one of the sum or the difference being based on applying a weight to at least one of the output signals; and determine a distance between the acoustic sensor and a reflection surface based on a time for the acoustic signal to arrive at the acoustic sensor in the particular direction after being generated and then reflected from the reflection surface.

17 Claims, 21 Drawing Sheets

(56) References Cited

U.S. PATENT DOCUMENTS

| | | | | |
|---|---|---|---|---|
| 2,578,973 | A * | 12/1951 | Hills | H01Q 23/00 |
| | | | | 343/822 |
| 2,982,941 | A * | 5/1961 | Chun | G01S 3/8055 |
| | | | | 330/145 |
| 4,421,957 | A * | 12/1983 | Wallace, Jr. | H04R 1/34 |
| | | | | 381/357 |
| 4,751,738 | A * | 6/1988 | Widrow | H04R 25/407 |
| | | | | 381/313 |
| 6,430,535 | B1 | 8/2002 | Spille et al. | |
| 6,498,581 | B1 * | 12/2002 | Yu | G01S 13/4463 |
| | | | | 342/147 |
| 7,379,553 | B2 | 5/2008 | Nakajima et al. | |
| 10,491,995 | B1 * | 11/2019 | Enstad | H04R 3/005 |
| 2003/0063759 | A1 * | 4/2003 | Brennan | H04R 3/005 |
| | | | | 381/94.2 |
| 2004/0001598 | A1 * | 1/2004 | Balan | H04R 3/005 |
| | | | | 381/92 |
| 2005/0147258 | A1 * | 7/2005 | Myllyla | H01Q 3/2611 |
| | | | | 381/94.2 |
| 2006/0093128 | A1 * | 5/2006 | Oxford | H04M 9/082 |
| | | | | 379/406.01 |
| 2006/0162998 | A1 * | 7/2006 | Hawkins | G10K 11/175 |
| | | | | 181/293 |
| 2006/0256974 | A1 * | 11/2006 | Oxford | H04R 3/005 |
| | | | | 381/66 |
| 2006/0262942 | A1 * | 11/2006 | Oxford | H04M 1/6033 |
| | | | | 381/66 |
| 2006/0262943 | A1 * | 11/2006 | Oxford | H04R 3/005 |
| | | | | 381/92 |
| 2006/0269074 | A1 * | 11/2006 | Oxford | H04M 1/6033 |
| | | | | 381/59 |
| 2006/0269080 | A1 * | 11/2006 | Oxford | H04R 29/007 |
| | | | | 381/92 |
| 2007/0047742 | A1 * | 3/2007 | Taenzer | H04R 29/006 |
| | | | | 381/92 |
| 2007/0050161 | A1 * | 3/2007 | Taenzer | G10K 11/346 |
| | | | | 702/75 |
| 2007/0247388 | A1 * | 10/2007 | Asakura | H01Q 19/108 |
| | | | | 343/834 |
| 2008/0144864 | A1 * | 6/2008 | Huon | H04R 5/02 |
| | | | | 381/305 |
| 2010/0215184 | A1 * | 8/2010 | Buck | H04R 3/002 |
| | | | | 381/66 |
| 2011/0019836 | A1 * | 1/2011 | Ishibashi | H04R 1/406 |
| | | | | 381/92 |
| 2011/0103625 | A1 * | 5/2011 | Srinivasan | G10L 21/0208 |
| | | | | 381/107 |
| 2012/0140947 | A1 * | 6/2012 | Shin | H04R 3/005 |
| | | | | 381/92 |
| 2012/0308039 | A1 * | 12/2012 | Kobayashi | H04R 1/406 |
| | | | | 381/92 |
| 2013/0083832 | A1 * | 4/2013 | Sorensen | H04R 3/005 |
| | | | | 375/224 |
| 2016/0050506 | A1 * | 2/2016 | Kim | H04R 29/00 |
| | | | | 381/56 |
| 2017/0061951 | A1 * | 3/2017 | Starobin | G10K 11/17881 |
| 2017/0289675 | A1 * | 10/2017 | Isotalo | H04R 1/323 |
| 2019/0072635 | A1 * | 3/2019 | Kang | G01S 3/805 |
| 2019/0094955 | A1 | 3/2019 | Zuber et al. | |
| 2019/0154439 | A1 * | 5/2019 | Binder | G01B 11/26 |
| 2020/0344543 | A1 * | 10/2020 | Taenzer | H04R 1/406 |
| 2020/0400489 | A1 | 12/2020 | Kang et al. | |
| 2021/0136487 | A1 * | 5/2021 | Shumard | H04R 1/326 |

FOREIGN PATENT DOCUMENTS

| | | | | |
|---|---|---|---|---|
| EP | 3 432 603 A1 | 1/2019 | | |
| EP | 3 445 069 A1 | 2/2019 | | |
| FR | 2405608 A * | 6/1979 | | H04R 1/227 |
| JP | 4747664 B2 | 8/2011 | | |
| JP | 2020-41978 A | 3/2020 | | |
| KR | 10-0551605 B1 | 2/2006 | | |
| KR | 10-1010099 B1 | 1/2011 | | |
| WO | 2011/145030 A1 | 11/2011 | | |
| WO | 2016/073936 A2 | 5/2016 | | |

OTHER PUBLICATIONS

Wikipedia, "Reverberation", https://en.wikipedia.org/wiki/Reverberation#Reverberation_time, Feb. 5, 2021 (last edited), Total 7 pages.

Communication dated Aug. 11, 2021, issued by the European Patent Office in European Application No. 21162831.8.

Communication dated Oct. 13, 2021 issued by the European Patent Office in European Application No. 21162831.8.

* cited by examiner

SYSTEM AND METHOD FOR MEASURING DISTANCE USING ACOUSTIC SIGNAL

CROSS-REFERENCE TO RELATED APPLICATION

This application is based on and claims priority under 35 U.S.C. § 119 to Korean Patent Application No. 10-2020-0124622, filed on Sep. 25, 2020, in the Korean Intellectual Property Office, the disclosure of which is incorporated by reference herein in its entirety.

BACKGROUND

1. Field

Example embodiments of the disclosure relate to a system and a method for measuring a distance using an acoustic signal.

2. Description of Related Art

The usability of acoustic sensors that are installed in household appliances, video display devices, virtual reality devices, augmented reality devices, artificial intelligence speakers, and the like to detect the direction of sound and recognize voice has increased. Recently, directional acoustic sensors for detecting acoustic signals by converting mechanical movements caused by pressure differences into electrical signals have been developed.

SUMMARY

One or more example embodiments provide a system and a method for measuring a distance using an acoustic signal.

Additional aspects will be set forth in part in the description which follows and, in part, will be apparent from the description, or may be learned by practice of the example embodiments of the disclosure.

According to an aspect of an example embodiment, there is provided a distance measurement system, including: at least one sound source configured to generate an acoustic signal; an acoustic sensor including a plurality of directional acoustic sensors that are arranged to have directionalities different from one another; at least one processor configured to: obtain a directionality of the acoustic signal in a particular direction based on at least one of a sum of output signals of the plurality of directional acoustic sensors or a difference between the output signals of the plurality of directional acoustic sensors, the at least one of the sum or the difference being based on applying a weight to at least one of the output signals; and determine a distance between the acoustic sensor and a reflection surface based on a time for the acoustic signal to arrive at the acoustic sensor in the particular direction after being generated and then reflected from the reflection surface.

The at least one sound source may include a plurality of sound sources, the plurality of sound sources being configured to generate a plurality of directional acoustic signals, respectively.

A distance between the plurality of sound sources may correspond to a half of a wavelength of each of the plurality of directional acoustic signals.

The distance measurement system may further include a controller configured to adjust a delay time of the plurality of directional acoustic signals generated by the plurality of sound sources.

The at least one sound source may be configured to generate an omni-directional acoustic signal.

The plurality of directional acoustic sensors may be arranged to form a certain angle with respect to one another.

The at least one processor may be further configured to apply a weight value of 1 to the output signals of the plurality of directional acoustic sensors.

The at least one processor may be further configured to obtain the directionality of the acoustic signal in a first direction based on the sum of the output signals of the plurality of directional acoustic sensors, and configured to obtain the directionality of the acoustic signal in a second direction, the second direction being perpendicular to the first direction, based on the difference between the output signals of the plurality of directional acoustic sensors.

The at least one processor may be further configured to, based on the directionality being the first direction, determine a first distance in the first direction between the acoustic sensor and the reflection surface, and based on the directionality being the second direction, determine a second distance in the second direction between the acoustic sensor and the reflection surface.

The at least one processor may be further configured to apply different weights to the output signals of the plurality of directional acoustic sensors.

The at least one processor may be further configured to, based on a change in a room transfer function (RTF) in the particular direction obtained from the acoustic sensor, detect at least one of a position of a first object newly located between the acoustic sensor and the reflection surface or a changed position of a second object between the acoustic sensor and the reflection surface.

Each of the plurality of directional acoustic sensors may include: a support; and a plurality of resonators, each of the plurality of resonators extending from the support.

The plurality of resonators may have resonance frequencies different from one another.

According to an aspect of an example embodiment, there is provided an electronic apparatus including: a speaker including at least one sound source configured to generate an acoustic signal; an acoustic sensor including a plurality of directional acoustic sensors that are arranged to have directionalities different from one another; and at least one processor configured to: obtain a directionality of the acoustic signal in a particular direction based on at least one of a sum of output signals of the plurality of directional acoustic sensors or a difference between the output signals of the plurality of directional acoustic sensors, the at least one of the sum or the difference being based on applying a weight to at least one of the output signals; and determine a distance between the acoustic sensor and a reflection surface based on a time for the acoustic signal to arrive at the acoustic sensor in the particular direction after being generated and then reflected from the reflection surface.

According to an aspect of an example embodiment, there is provided a distance measurement method, including: generating an acoustic signal in at least one sound source; receiving the acoustic signal by an acoustic sensor, the acoustic sensor including a plurality of directional acoustic sensors arranged to have directionalities different from one another; obtaining a directionality of the acoustic signal in a particular direction based on at least one of a sum of output signals of the plurality of directional acoustic sensors or a difference between the output signals of the plurality of directional acoustic sensors, the at least one of the sum or the difference being based on applying a weight to at least one of the output signals; and determining a distance between the acoustic sensor and a reflection surface based on a time for the acoustic signal to arrive at the acoustic sensor in the particular direction after being generated and then reflected from the reflection surface.

The applying the weight may include applying a weight value of 1 to the output signals of the plurality of directional acoustic sensors.

The obtaining the directionality and the determining the distance may include obtaining the directionality of the acoustic signal in a first direction based on the sum of the output signals of the plurality of directional acoustic sensors and determining a first distance in the first direction between the acoustic sensor and the reflection surface.

The obtaining the directionality and the determining the distance may include obtaining the directionality of the acoustic signal in a second direction based on the difference between the output signals of the plurality of directional acoustic sensors and determining a second distance in the second direction between the acoustic sensor and the reflection surface.

The applying the weight may include applying different weights to the output signals of the plurality of directional acoustic sensors.

The distance measurement method may further include detecting, based on a change in a room transfer function (RTF) in the particular direction obtained from the acoustic sensor, at least one of a position of a first object newly located between the acoustic sensor and the reflection surface or a changed position of a second object between the acoustic sensor and the reflection surface.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
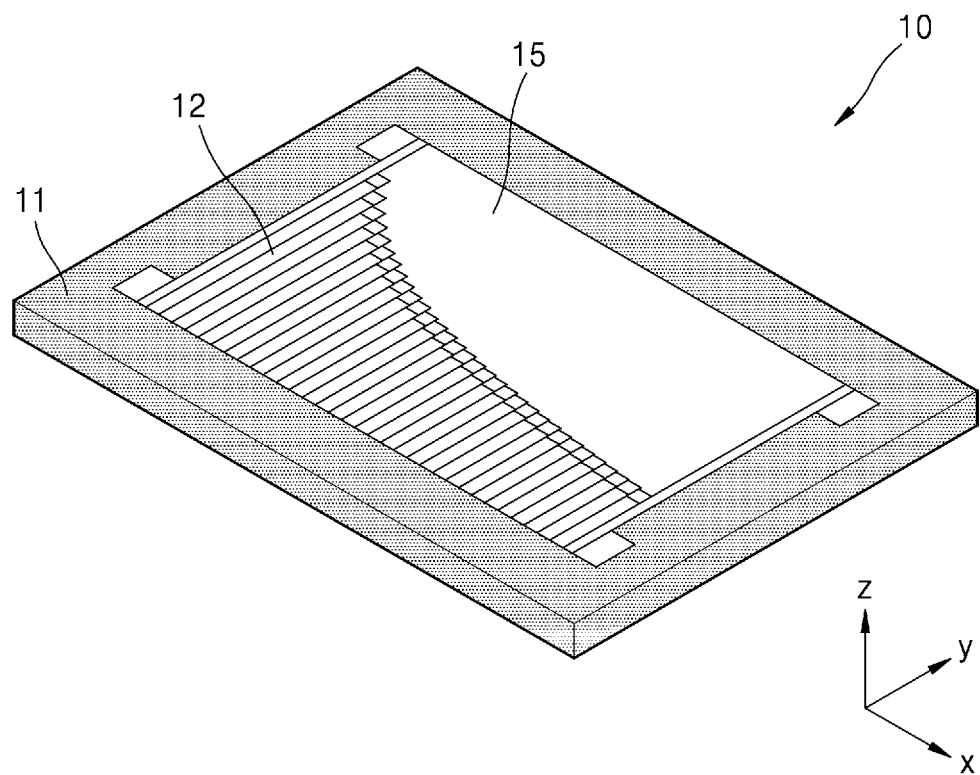
FIG. 1 is a view illustrating a general directional acoustic sensor.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects of the disclosure. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments are described in detail with reference to the accompanying drawings. In the drawings, like reference numerals denote like constituent elements, and the size of each constituent element may be exaggerated for clarity and convenience of explanation. The below-described embodiments are merely examples, and various modifications are possible from the example embodiments.

When a constituent element is disposed "above" or "on" to another constituent element, the constituent element may include not only an element directly contacting on a side (e.g., upper, lower, left, or right side) of the other constituent element, but also an element disposed above, under, left, or right the other constituent element in a non-contact manner. An expression used in a singular form in the specification also includes the expression in its plural form unless clearly specified otherwise in context. Also, terms such as "include" or "comprise" may be construed to denote a certain constituent element, but may not be construed to exclude the existence of or a possibility of addition of one or more other constituent elements.

The use of the terms "a" and "an" and "the" and similar referents in the context of describing the disclosure are to be construed to cover both the singular and the plural. Also, the steps of all methods described herein can be performed in any suitable order unless otherwise indicated herein or otherwise clearly contradicted by context. The disclosure is not limited to the described order of the steps.

Furthermore, terms such as "-portion," "-unit," "-module," and "-block" stated in the specification may signify a unit to process at least one function or operation and the unit may be embodied by hardware, software, or a combination of hardware and software.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The use of any and all examples, or language (e.g., "such as") provided herein, is intended merely to better illuminate the disclosure and does not pose a limitation on the scope of the disclosure unless otherwise claimed.

Figure 2:
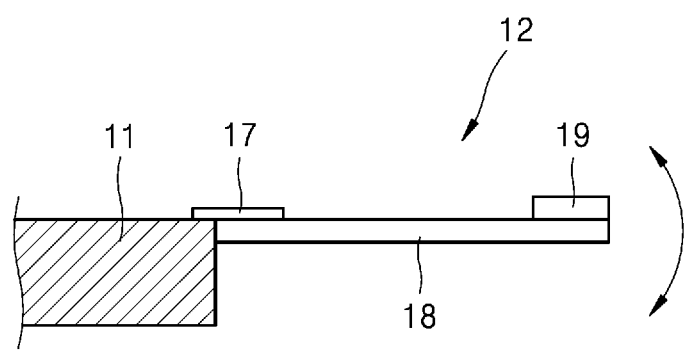
FIG. 2 is a cross-sectional view of a resonator of FIG. 1.

FIG. 1 is a view illustrating a general directional acoustic sensor 10. FIG. 2 is a cross-sectional view of one of a plurality of resonators 12 of FIG. 1.

Referring to FIGS. 1 and 2, the general directional acoustic sensor 10 may include a support 11 and the plurality of resonators 12. A cavity 15 is formed by penetrating the support 11. Although, for example, a silicon substrate may be used as the support 11, the disclosure is not limited thereto.

The resonators 12 may be arranged in the cavity 15 of the support 11 in a certain pattern. The resonators 12 may be arranged on a plane without overlapping each other. As illustrated in FIG. 2, each of the resonators 12 may be provided with a first side fixed to the support 11 and a second side extending toward the cavity 15. Each of the resonators 12 may include a driving portion 18 configured to move in response to an acoustic signal that is input, and a sensing portion 17 configured to transmit a movement of the driving portion 18. Furthermore, the resonators 12 may include a mass 19 configured to provide a certain mass to the driving portion 18.

The resonators 12 may be provided to detect, for example, acoustic frequencies in bands different from each other. In other words, the resonators 12 may be provided to have center frequencies different from each other. To this end, the resonators 12 may be provided to have dimensions different from each other. For example, the resonators 12 may be provided to have lengths, widths, or thicknesses different from each other.

Figure 3:
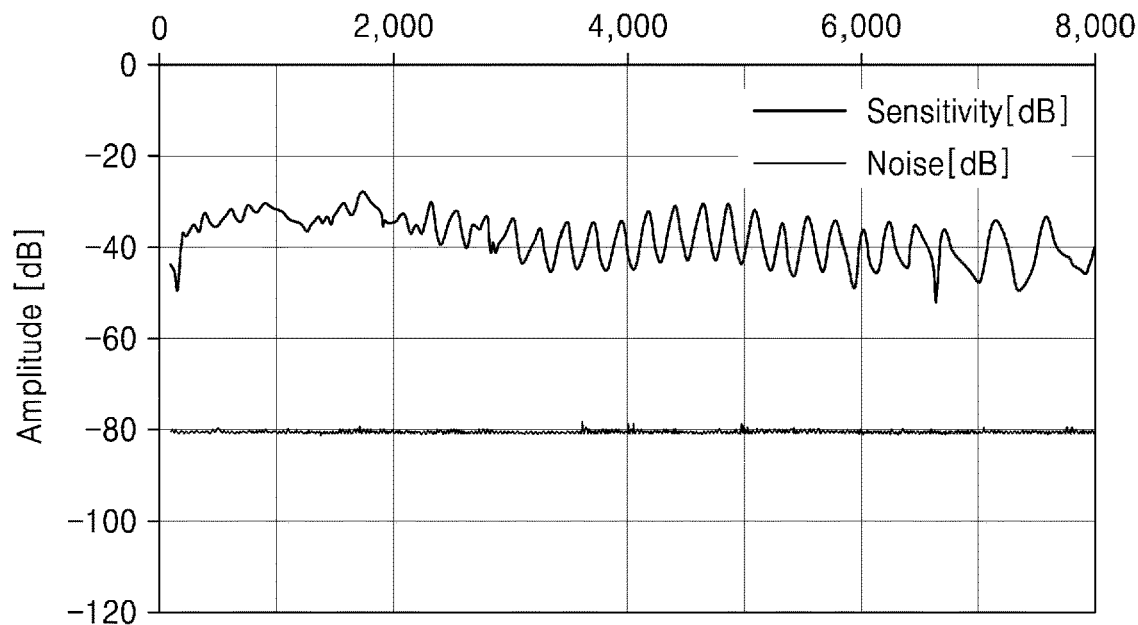
FIG. 3 is a graph of a measurement result of a frequency response characteristic of the general directional acoustic sensor of FIG. 1.
Figure 4:
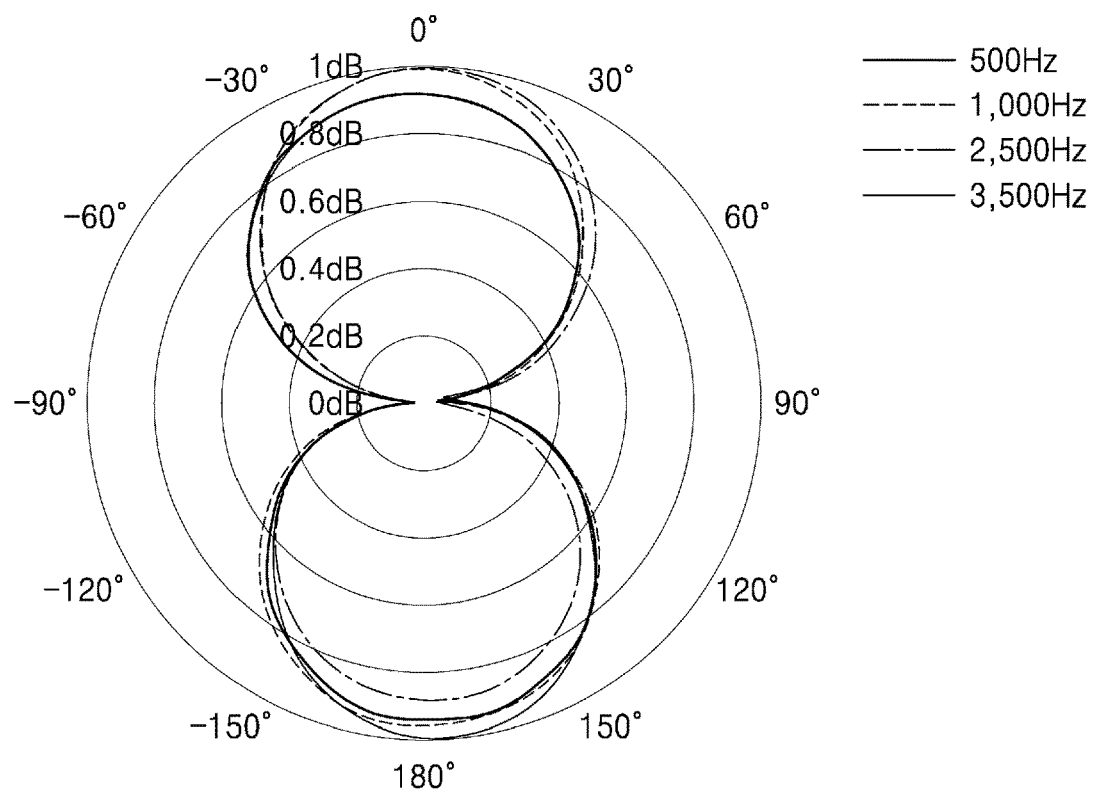
FIG. 4 is a view illustrating a measurement result of a directional characteristic of the general directional acoustic sensor of FIG. 1.

FIG. 3 is a graph illustrating an example measurement result of a frequency response characteristic of the general directional acoustic sensor 10 of FIG. 1. FIG. 4 is a view illustrating an example measurement result of a directional characteristic of the general directional acoustic sensor 10 of FIG. 1. As illustrated in FIG. 4, it may be seen that the general directional acoustic sensor 10 has bi-directionality, that is, directionality in a z-axis direction of 0° direction and a z-axis direction of 180° direction.

Figure 5:
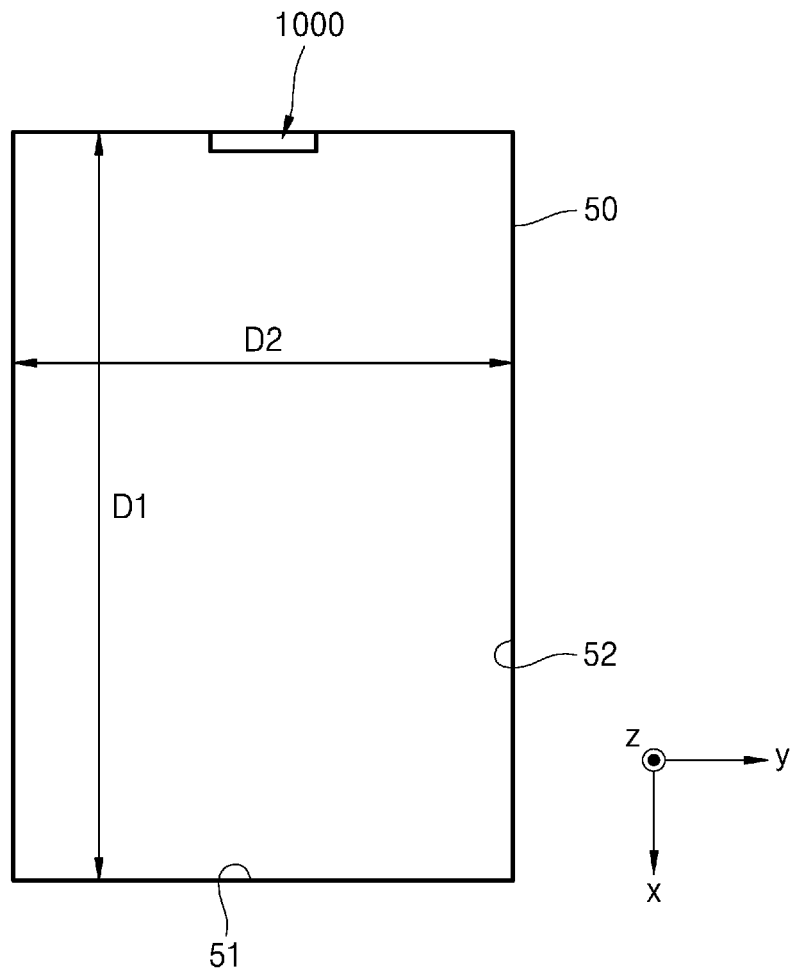
FIG. 5 is a view illustrating an example in which a distance measurement system according to an example embodiment is arranged in a room.
Figure 6:
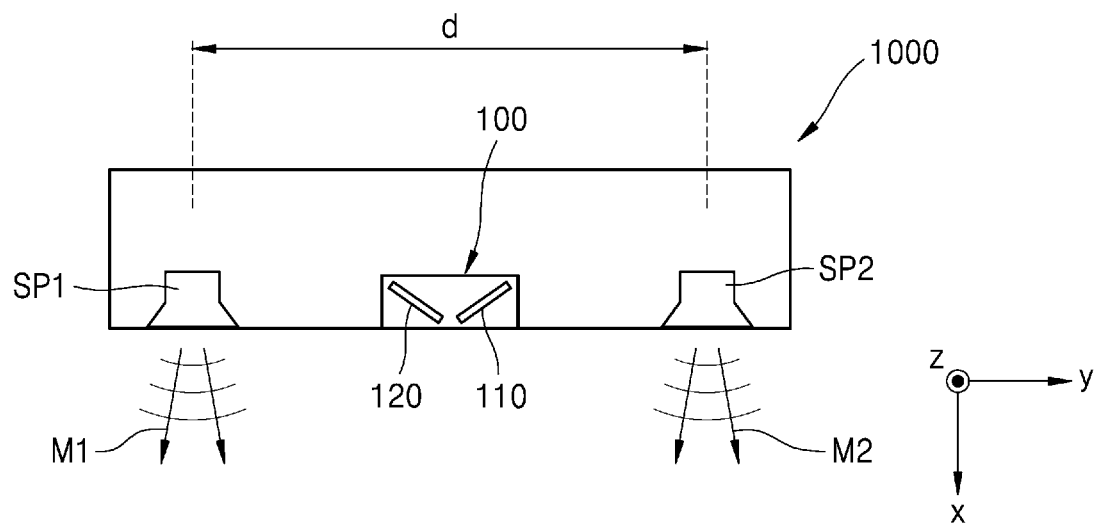
FIG. 6 is a view schematically illustrating a distance measurement system according to an example embodiment.
Figure 7:
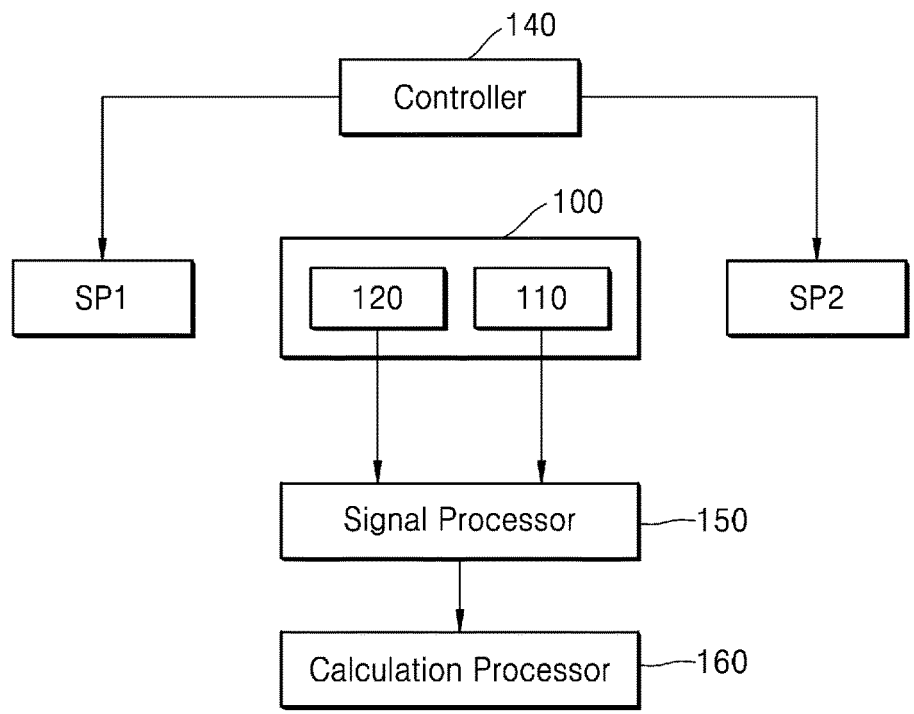
FIG. 7 is a block diagram of a schematic configuration of the distance measurement system of FIG. 6.

FIG. 5 is a view illustrating that a distance measurement system 1000 according to an example embodiment is arranged in a room. FIG. 6 is a view schematically illustrating the distance measurement system 1000 of FIG. 5. FIG. 7 is a block diagram of a schematic configuration of the distance measurement system 1000 of FIG. 6.

Referring to FIGS. 5 to 7, the distance measurement system 1000 is provided at one side wall of a room 50. The distance measurement system 1000 may be located at a center portion with respect to a lateral direction (e.g., a y-axis direction in FIG. 5). The room 50 may have a width D1 in a front direction (e.g., an x-axis direction in FIG. 5) of the distance measurement system 1000 and a width D2 in the lateral direction thereof. The distance measurement system 1000 according to an example embodiment may measure the width D1 in the front direction by using an acoustic signal generated in the distance measurement system 1000 and reflected from a first reflection surface 51, and the width D2 in the lateral direction by using an acoustic signal generated in the distance measurement system 1000 and reflected from a second reflection surface 52, and accordingly may obtain information about the size of the room 50.

The distance measurement system 1000 may include a plurality of sound sources SP1 and SP2, an acoustic sensor 100, a signal processor 150, and a calculation processor 160. The sound sources SP1 and SP2 may generate directional acoustic signals. The acoustic sensor 100 may include a plurality of directional acoustic sensors, for example, a first directional acoustic sensor 110 and a second directional acoustic sensor 120, which are arranged to have directionalities different from one another. The signal processor 150 calculates at least one of the sum of output signals of the first directional acoustic sensor 110 and the second directional acoustic sensor 120 and the difference between the output signals of the first directional acoustic sensor 110 and the second directional acoustic sensor 120 by applying a preset weight (e.g., applying a preset weight to the output signal of the first directional acoustic sensor 110 and/or the output signal of the second directional acoustic sensor 120). Based on the calculated at least one of the sum and the difference, the acoustic sensor 100 may obtain directionality in a particular direction. The calculation processor 160 may measure a distance between the acoustic sensor 100 and the first reflection surface 51 and a distance between the acoustic sensor 100 and the second reflection surface 52 by calculating the time for a directional acoustic signal to arrive at the acoustic sensor 100 after being generated and then reflected from the first reflection surface 51 and the second reflection surface 52, respectively. In an example embodiment, the signal processor 150 and the calculation processor 160 may be integrated into one or more processors.

The sound sources SP1 and SP2 may include a first sound source SP1 configured to generate a first acoustic signal M1 and a second sound source SP2 configured to generate a second acoustic signal M2. The first acoustic signal M1 and the second acoustic signal M2 each may be an omni-directional acoustic signal.

In an example embodiment, the first sound source SP1 and the second sound source SP2 respectively generate the first acoustic signal M1 and the second acoustic signal M2 simultaneously or with a temporal interval, that is, a delay time, in a particular direction. Accordingly, for example, an acoustic signal having directionality in the front direction or lateral direction of the distance measurement system 1000 may be generated. A distance d between the first sound source SP1 and the second sound source SP2 may be ½ of the wavelength of each of the first acoustic signal M1 and the second acoustic signal M2.

A controller 140 connected to the first sound source SP1 and the second sound source SP2 may be configured to control a phase difference between the first acoustic signal M1 and the second acoustic signal M2 by adjusting a delay time. Although FIG. 6 illustrates a case in which the distance measurement system 1000 includes two sound sources SP1 and SP2, this is merely an example, and three or more sound sources may be used.

Figure 8:
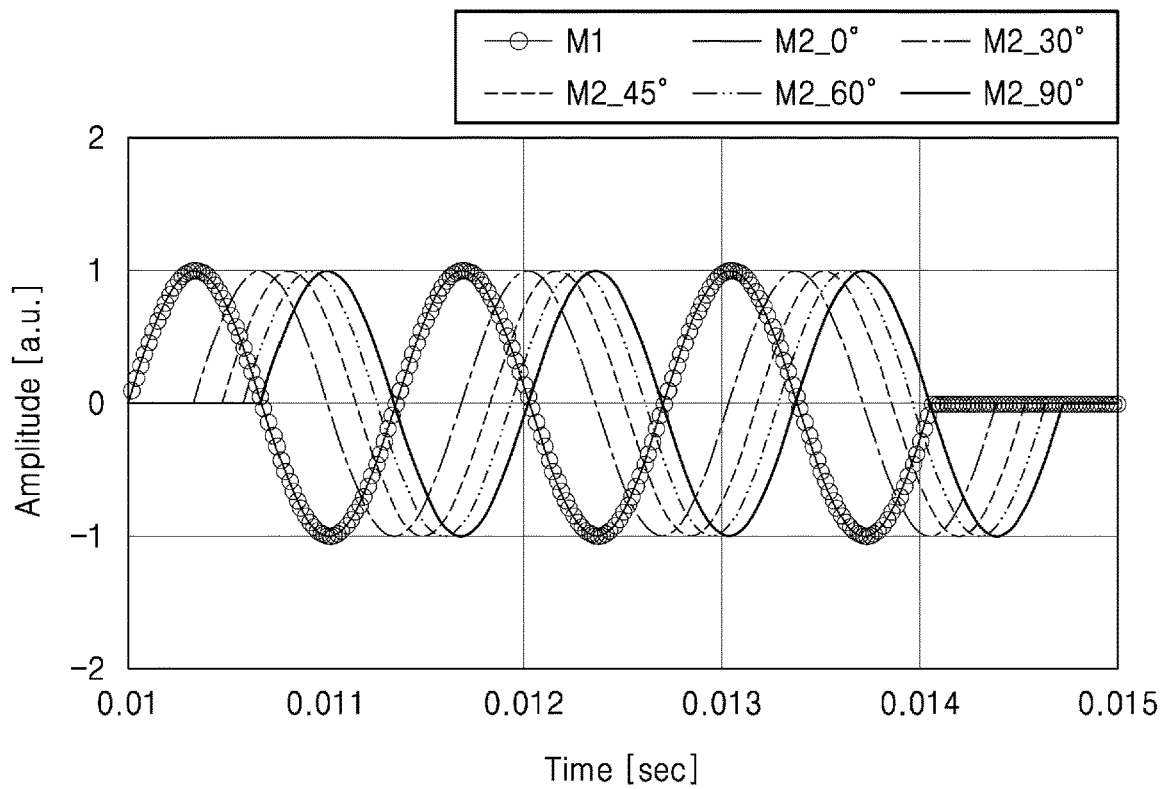
FIG. 8 is a graph of a first acoustic signal and a second acoustic signal respectively generated by a first sound source and a second sound source in the distance measurement system of FIG. 6.

FIG. 8 is a graph of the first acoustic signal M1 and the second acoustic signal M2 respectively generated by the first sound source SP1 and the second sound source SP2 in the distance measurement system 1000 of FIG. 6. FIG. 8 illustrates a case in which the first acoustic signal M1 and the second acoustic signal M2 of a sine wave are generated at a frequency of 850 Hz from the first sound source SP1 and the second sound source SP2.

Referring to FIG. 8, after the first sound source SP1 generates the first acoustic signal M1, the second sound source SP2 generates waveforms of the second acoustic signal M2 with certain time intervals (delay times). Accordingly, a phase difference according to a delay time may exist between the first acoustic signal M1 and the second acoustic signal M2. FIG. 8 illustrates that the second acoustic signals M2 have phase differences of 0°, 30°, 45°, 60°, and 90° with respect to the first acoustic signal M1 according to a delay time.

Figure 9:
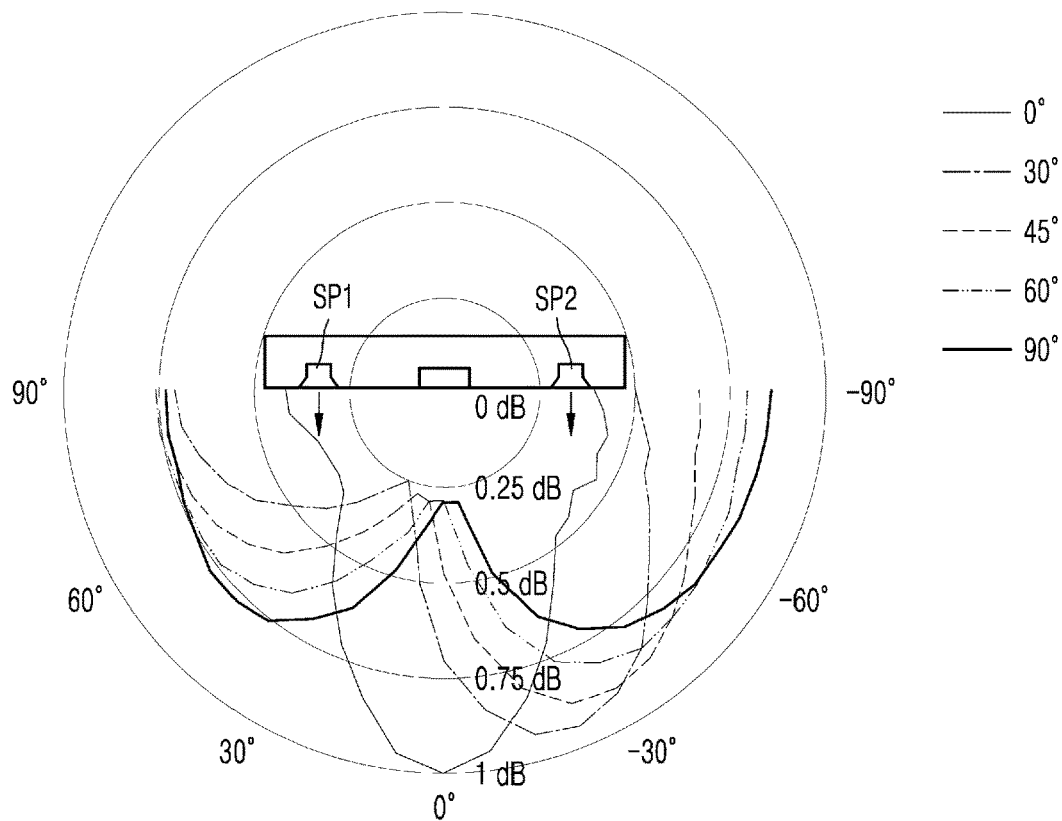
FIG. 9 is a view illustrating a directional characteristic according to a phase difference between a first acoustic signal and a second acoustic signal in FIG. 8.

FIG. 9 is a view illustrating a directional characteristic according to the phase difference between the first acoustic signal M1 and the second acoustic signal M2 in FIG. 8.

Referring to FIG. 9, when the phase difference between the first acoustic signal M1 and the second acoustic signal M2 is 0°, that is, the first sound source SP1 and the second sound source SP2 simultaneously generate the first acoustic signal M1 and the second acoustic signal M2, it may be seen that an acoustic signal having directionality toward the front direction (e.g., x-axis direction) is generated. Furthermore, when the phase difference between the first acoustic signal M1 and the second acoustic signal M2 is 90°, that is, a delay time between the first acoustic signal M1 and the second acoustic signal M2 corresponds to the half wavelength of a sine wave, it may be seen that an acoustic signal having directionality toward the lateral direction (e.g., y-axis direction) is generated. As such, as the first sound source SP1 and the second sound source SP2 generate the first acoustic signal M1 and the second acoustic signal M2 simultaneously or with a temporal interval, an acoustic signal having directionality in a desired direction may be generated.

As such, an acoustic signal having directionality in a particular direction is generated by the sound sources SP1 and SP2, reflected from the first reflection surface 51 and the second reflection surface 52, and received by the acoustic sensor 100 having directionality in a particular direction, as described below.

Figure 10:
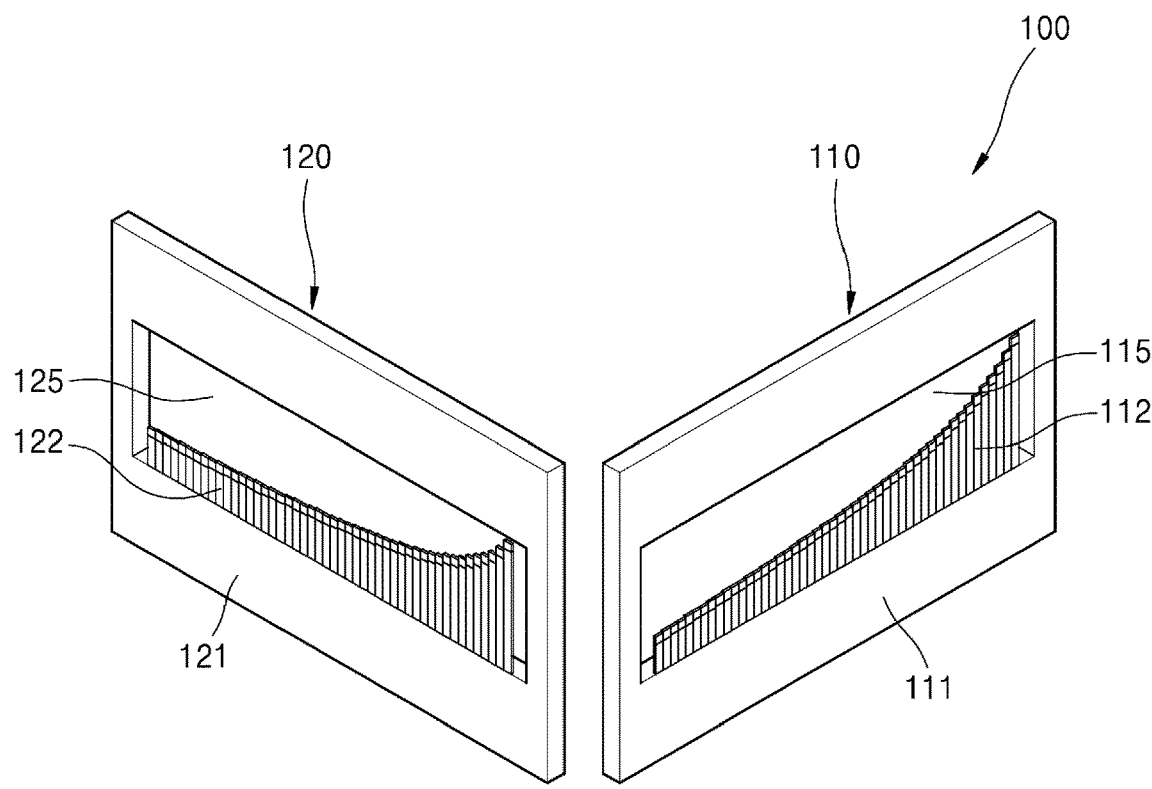
FIG. 10 is a perspective view of an acoustic sensor of a distance measurement system according to an example embodiment.
Figure 11:
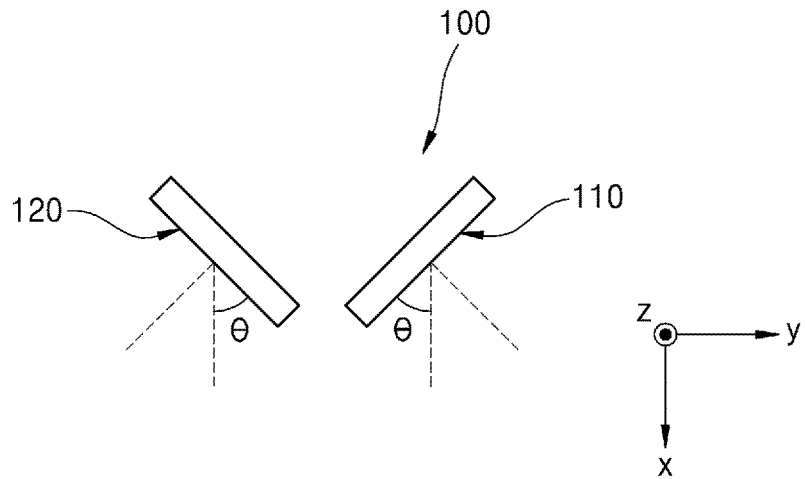
FIG. 11 is a plan view of the acoustic sensor of FIG. 10.

FIG. 10 is a perspective view of an acoustic sensor 100 of a distance measurement system according to an example embodiment. FIG. 11 is a plan view of the acoustic sensor 100 of FIG. 10.

Referring to FIGS. 10 and 11, the acoustic sensor 100 may include the first directional acoustic sensor 110 and the second directional acoustic sensor 120 arranged to have directionalities different from one another. Each of the first directional acoustic sensor 110 and the second directional acoustic sensor 120 may have the same configuration as the above-described general directional acoustic sensor 10 of FIG. 1.

The first directional acoustic sensor 110 may include a first support 111, in which a first cavity 115 is formed by penetrating the same, and a plurality of first resonators 112 arranged in the first cavity 115. The first resonators 112 may have resonance frequencies different from each other. Each of the first resonators 112 may be provided with one end portion fixed to the first support 111 and the other end portion extending toward the first cavity 115.

The second directional acoustic sensor 120 may include a second support 121, in which a second cavity 125 is formed by penetrating the same, and a plurality of second resonators 122 arranged in the second cavity 125. The second resonators 122 may have resonance frequencies different from each other. Each of the second resonators 122 may be provided with one end portion fixed to the second support 121 and the other end portion extending toward the second cavity 125.

The first directional acoustic sensor 110 and the second directional acoustic sensor 120 may be arranged to have directionalities different from one another. To this end, the first directional acoustic sensor 110 and the second directional acoustic sensor 120 may be arranged to form a certain angle with respect to each other. The first directional acoustic sensor 110 and the second directional acoustic sensor 120 may be arranged symmetrically with respect to the front direction (e.g., the x-axis direction of FIG. 10) of the acoustic sensor 100. The first directional acoustic sensor 110 and the second directional acoustic sensor 120 may be arranged to be inclined at a certain angle θ with respect to the front direction of the acoustic sensor 100. Accordingly, the first directional acoustic sensor 110 and the second directional acoustic sensor 120 may be arranged at an angle 2θ with respect to each other.

For example, the first directional acoustic sensor 110 and the second directional acoustic sensor 120 each may be arranged to be inclined at an angle of 45° with respect to the front direction (the x-axis direction of FIG. 10) of the acoustic sensor 100. In this case, the first directional acoustic sensor 110 and the second directional acoustic sensor 120 may form an angle of 90° with respect to each other. However, this is merely an example, and the angle between the first directional acoustic sensor 110 and the second directional acoustic sensor 120 may be variously changed.

The signal processor 150 of FIG. 7 may variously adjust the directional characteristic of the acoustic sensor 100 as described below by using output signals measured by the first directional acoustic sensor 110 and the second directional acoustic sensor 120. To this end, the signal processor 150 may calculate at least one of the sum of and the difference between the output signal of the first directional acoustic sensor 110 and the output signal of the second directional acoustic sensor 120, by applying a preset weight to at least one of the output signals of the first directional acoustic sensor 110 and the second directional acoustic sensor 120, thereby obtaining a directional characteristic in a desired direction.

Figure 12:
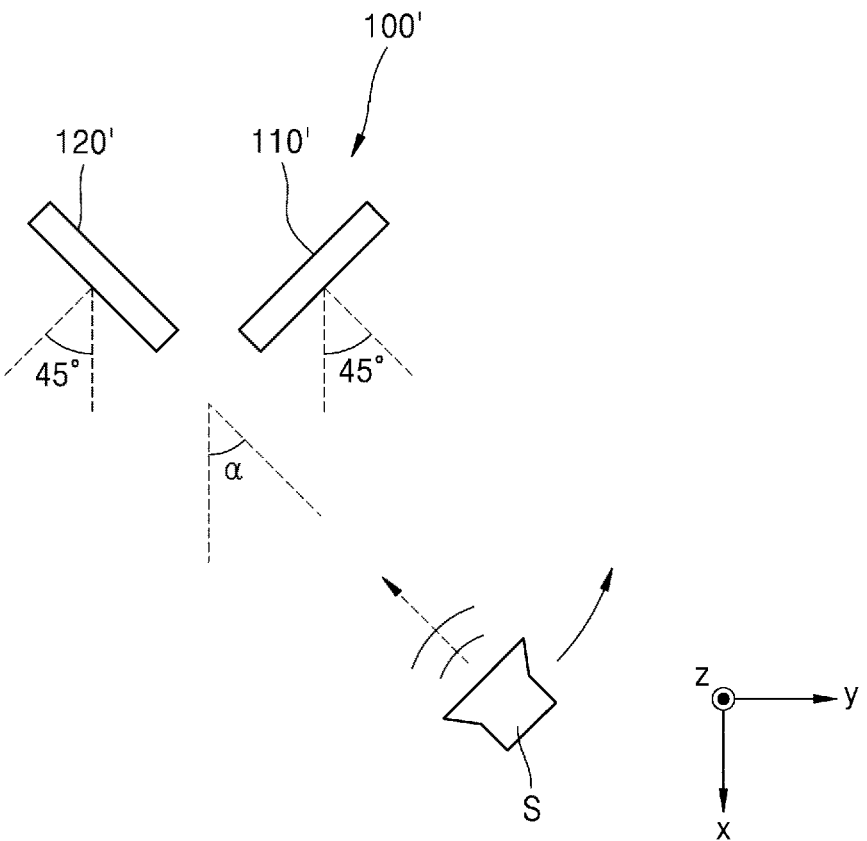
FIG. 12 is a plan view of an acoustic sensor manufactured as a simulation experiment model.

FIG. 12 is a plan view of an acoustic sensor 100' manufactured as a simulation experiment model. The acoustic sensor 100' of FIG. 12 is substantially the same as the acoustic sensor 100 of FIG. 10, except that a first directional acoustic sensor 110' and a second directional acoustic sensor 120' respectively include one first resonator and one second resonator. Although not illustrated in FIG. 12, the first directional acoustic sensor and the second directional acoustic sensor 110' and 120' are connected to the signal processor.

Referring to FIG. 12, the first directional acoustic sensor and the second directional acoustic sensor 110' and 120' each are arranged to be inclined at an angle of 45° with respect to the front direction, for example, the x-axis direction, of the acoustic sensor 100', and thus the first directional acoustic sensor and the second directional acoustic sensor 110' and 120' are arranged to form an angle of 90° with respect to each other. A sound source S for generating sound is arranged to be inclined at an angle α with respect to the front direction, for example, the x-axis direction, of the acoustic sensor 100'.

Figure 13:
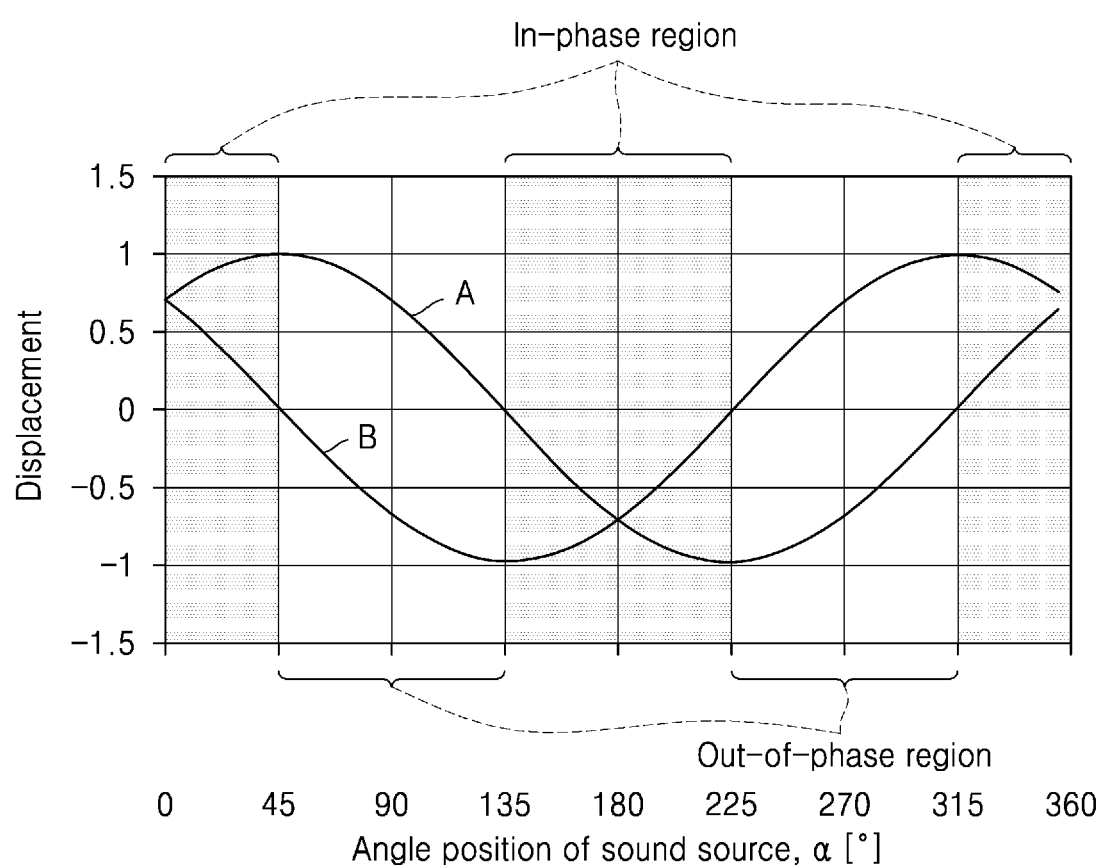
FIG. 13 is a graph of a simulation result of displacements of resonators according to a position of a sound source S in the acoustic sensor of FIG. 12.

FIG. 13 is a graph of a simulation result of displacements of resonators according to the position of the sound source S in the acoustic sensor 100' of FIG. 12; FIG. 13 illustrates the displacements of resonators generated as the sound source S moves in a counterclockwise direction in the acoustic sensor 100' of FIG. 12. In FIG. 13, "A" denotes a displacement generated in a first resonator of the first directional acoustic sensor 110', and "B" denotes a displacement generated in a second resonator of the second directional acoustic sensor 120'.

Referring to FIG. 13, it may be seen that, when the angle α at which the sound source S is located is 0°-45°, 135°-225°, and 315°-360°, the first resonator and the second resonator move in-phase, and when the angle α at which the sound source S is located is 45°-135° and 225°-315°, the first resonator and the second resonator move out-of-phase. The first resonator and the second resonator moving in-phase may mean that the first resonator and the second resonator are respectively displaced in the same direction with respect to the initial positions thereof, and the first resonator and the second resonator moving out-of-phase may mean that the first resonator and the second resonator are respectively displaced in directions different from each other with respect to the initial positions thereof.

As such, it may be seen that, when the sound source S is located in the front direction, for example, the x-axis direction of FIG. 12, of the acoustic sensor 100', the first resonator and the second resonator move in-phase, and when the sound source S is located in the lateral direction, for example, the y-axis direction of FIG. 8, of the acoustic sensor 100', the first resonator and the second resonator move out-of-phase.

Figure 14:
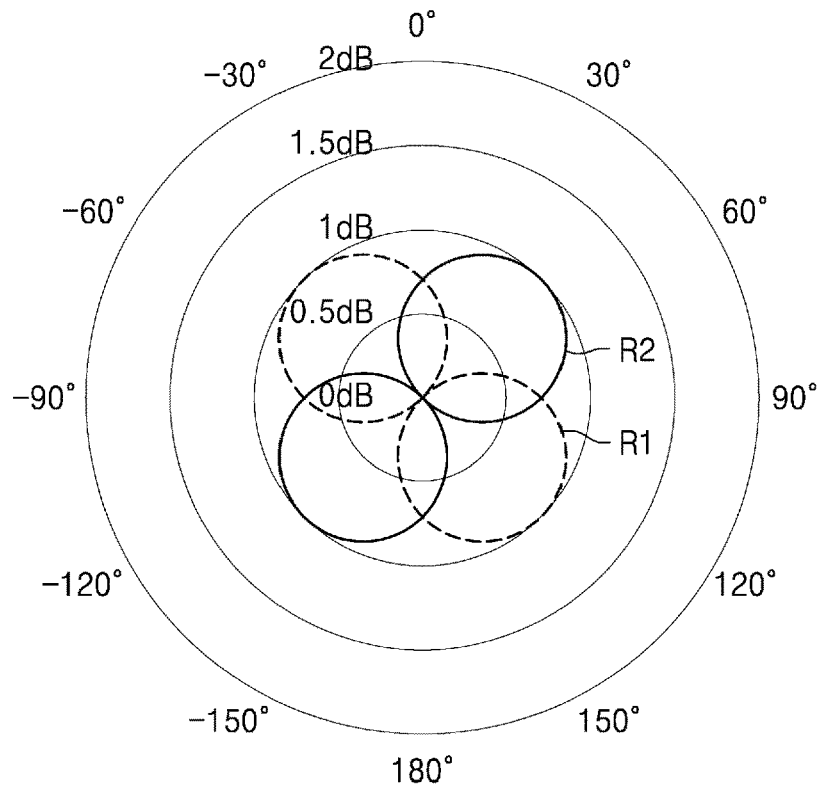
FIG. 14 is a view illustrating a simulation result of a directional characteristic of a first directional acoustic sensor and a directional characteristic of a second directional acoustic sensor in the acoustic sensor of FIG. 12.

FIG. 14 is a view illustrating a simulation result of the directional characteristic of the directional characteristic of the first directional acoustic sensor 110' and the second directional acoustic sensor 120' in the acoustic sensor 100' of FIG. 12. In FIG. 14, "R1" denotes the directional characteristic of the first directional acoustic sensor 110', and "R2" denotes the directional characteristic of the second directional acoustic sensor 120'.

Referring to FIG. 14, it may be seen that the first directional acoustic sensor 110' and the second directional acoustic sensor 120' have directionalities different from one another. In detail, the first directional acoustic sensor 110' may have directionality of a −45° direction, for example, a direction between a (−) x-axis direction and a (−) y-axis direction of FIG. 12, and a 135° direction, for example, a direction between a (+)x-axis direction and a (+)y-axis direction of FIG. 12. The second directional acoustic sensor 120' may have directionality of a 45° direction, for example, a direction between a (−)x-axis direction and a (+)y-axis direction of FIGS. 12, and a −135° direction, for example, a direction between the (+)x-axis direction and a (−)y-axis direction of FIG. 12.

Figure 15:
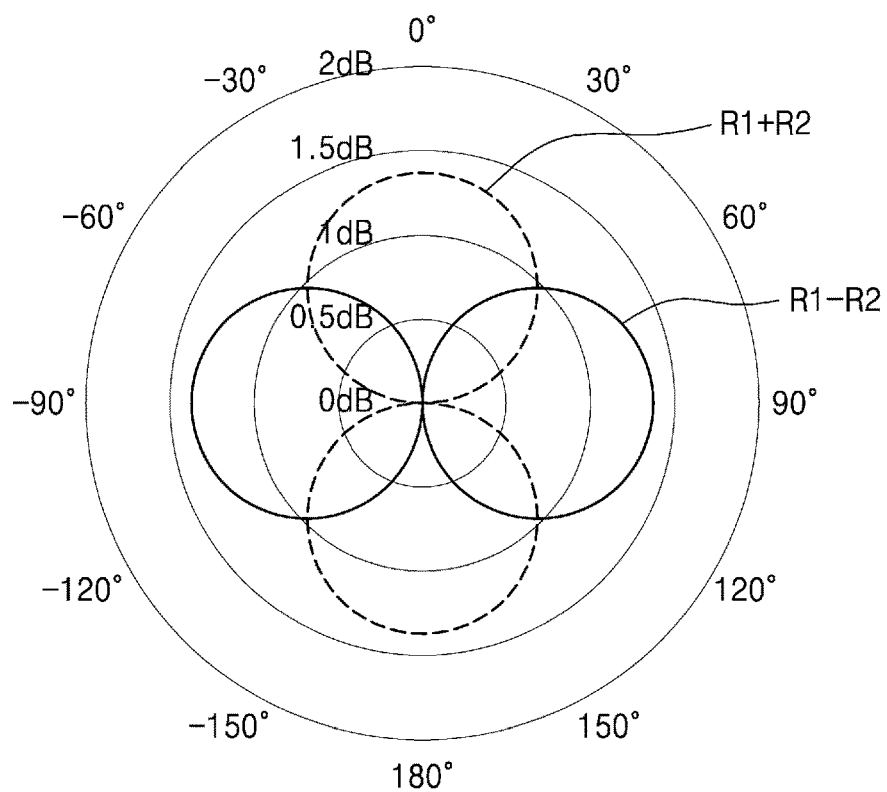
FIG. 15 is a view illustrating a simulation result of a directional characteristic obtained based on a sum of and a difference between outputs of a first directional acoustic sensor and a second directional acoustic sensor in the acoustic sensor of FIG. 12.

FIG. 15 is a view illustrating a simulation result of a directional characteristic obtained by calculating the sum of and the difference between the outputs of the first directional acoustic sensor and the second directional acoustic sensor 110' and 120' in the acoustic sensor 100' of FIG. 12. In FIG. 15, "R1+R2" denotes a directional characteristic obtained based the sum of an output signal of the first directional acoustic sensor 110' and an output signal of the second directional acoustic sensor 120', and "R1−R2" denotes a directional characteristic obtained based on the difference between the output signal of the first directional acoustic sensor 110' and the output signal of the second directional acoustic sensor 120'.

Referring to FIG. 15, the directional characteristic obtained by calculating the sum of the output signal of the first directional acoustic sensor 110' and the output signal of the second directional acoustic sensor 120' have directionality in the front direction, for example, the x-axis direction of the acoustic sensor 100' of FIG. 12, and the directional characteristic obtained by calculating the difference between the output signal of the first directional acoustic sensor 110' and the output signal of the second directional acoustic sensor 120' have directionality in the lateral direction, for example, the y-axis direction of the acoustic sensor 100' of FIG. 12.

Figure 16:
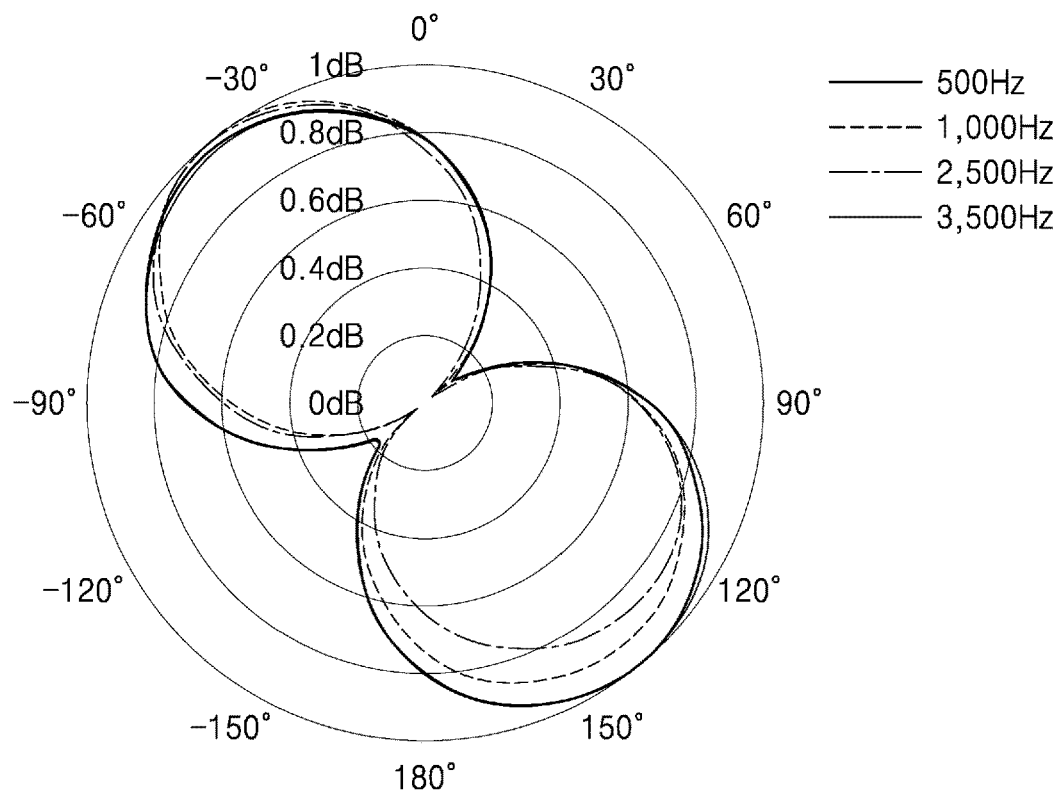
FIG. 16 is a view illustrating an experiment result of measurement of a directional characteristic of a first directional acoustic sensor for each of four frequencies in the acoustic sensor of FIG. 10.
Figure 17:
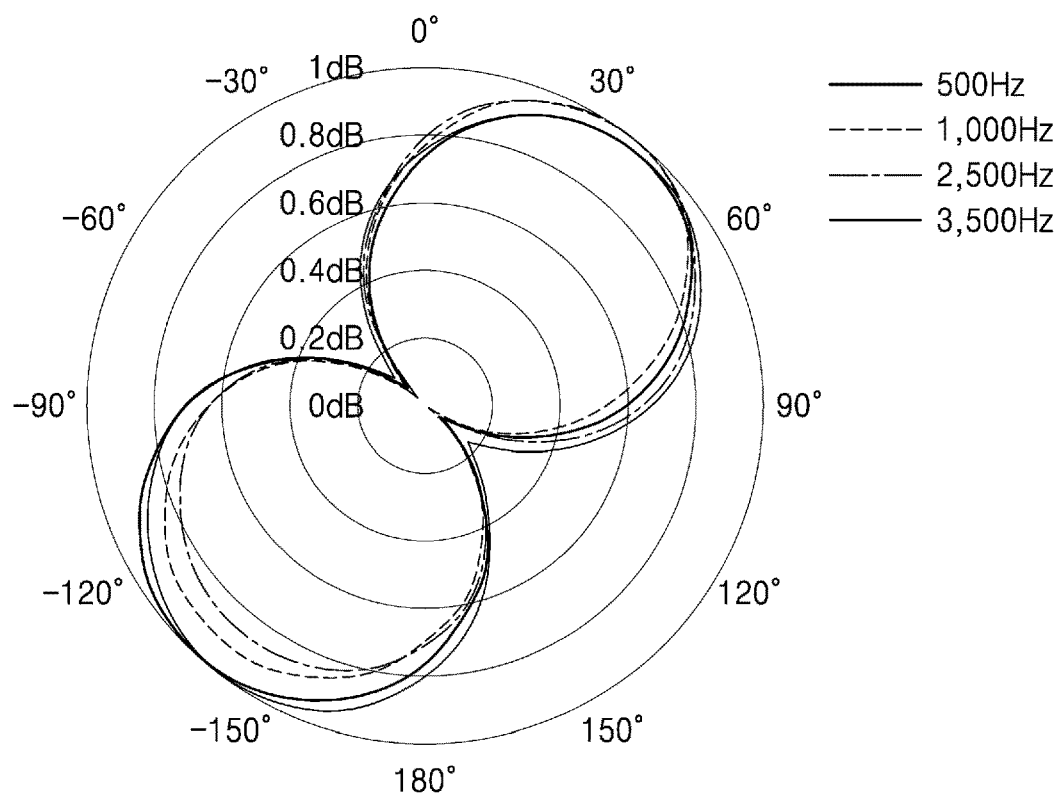
FIG. 17 is a view illustrating an experiment result of measurement of a directional characteristic of a second directional acoustic sensor for each of four frequencies in the acoustic sensor of FIG. 10.

FIGS. 16 and 17 illustrate experiment results of the measurement of the directional characteristic of the first directional acoustic sensor 110 and the second directional acoustic sensor 120 in the acoustic sensor 100 of FIG. 10. The first directional acoustic sensor 110 and the second directional acoustic sensor 120 each are arranged to be inclined at an angle of 45° with respect to the front direction of the acoustic sensor 100, for example, the x-axis direction of FIG. 11, and thus the first directional acoustic sensor 110 and the second directional acoustic sensor 120 are arranged to form an angle of 90° with respect to each other.

FIG. 16 is a view illustrating an experiment result of measurement of the directional characteristic of the first directional acoustic sensor 110 for each of four frequencies in the acoustic sensor 100 of FIG. 10. Referring to FIG. 16, it may be seen that the first directional acoustic sensor 110 has directionality of a −45° direction, for example, a direction between a (−)x-axis direction and a (−)y-axis direction of FIG. 11, and a directionality of a 135° direction, for example, a direction between a (+)x-axis direction and a (+)y-axis direction of FIG. 11.

FIG. 17 is a view illustrating an experiment result of measurement of the directional characteristic of the second directional acoustic sensor 120 for each of four frequencies in the acoustic sensor 100 of FIG. 10. Referring to FIG. 17, it may be seen that the second directional acoustic sensor 120 has directionality of a 45° direction, for example, a direction between the (−)x-axis direction and the (+)y-axis direction of FIG. 11, and a −135° direction, for example, a direction between the (+)x-axis direction and the (−)y-axis direction of FIG. 11.

Figure 18:
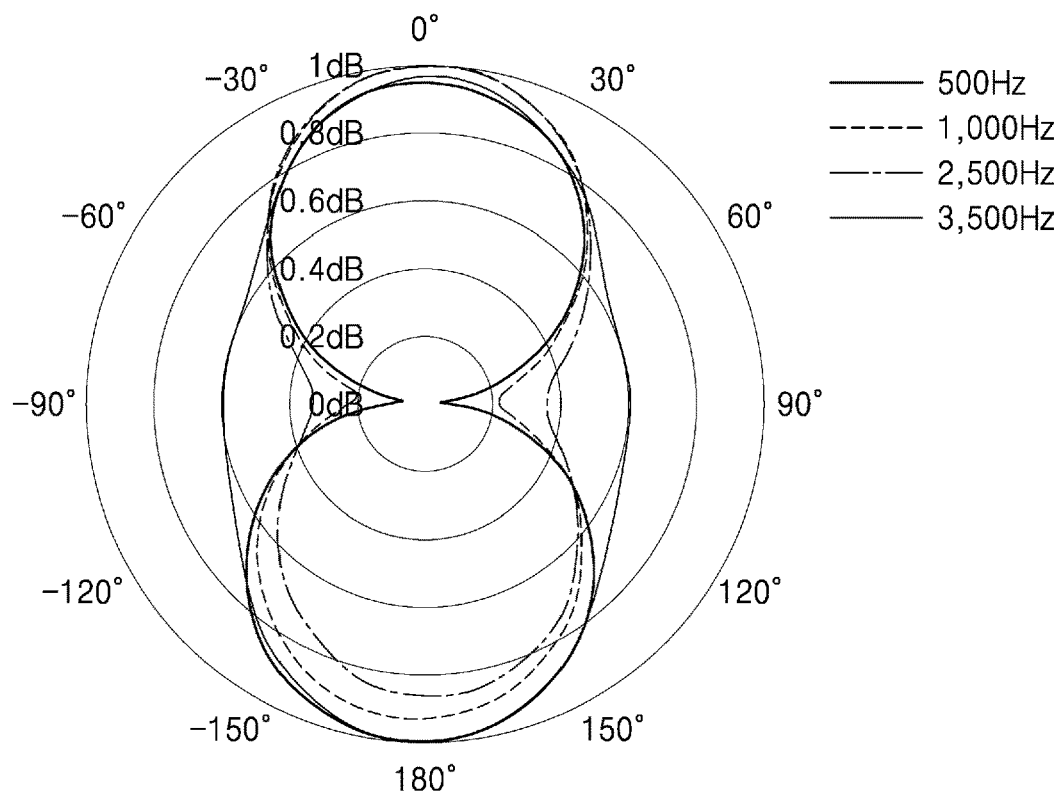
FIG. 18 is a view illustrating an experiment result of a directional characteristic obtained based on a sum of an output signal of a first directional acoustic sensor and an output signal of a second directional acoustic sensor in the acoustic sensor of FIG. 10.

FIG. 18 is a view illustrating an experiment result of a directional characteristic obtained by calculating the sum of an output signal of the first directional acoustic sensor 110 and an output signal of the second directional acoustic sensor 120 in the acoustic sensor 100 of FIG. 10 FIG. 18 illustrates the directional characteristic obtained based on the sum of the output signal of the first directional acoustic sensor 110 and the output signal of the second directional acoustic sensor 120. Referring to FIG. 18, it may be seen that a directional characteristic obtained by calculating the sum of the output signal of the first directional acoustic sensor 110 and the output signal of the second directional acoustic sensor 120 has directionality of the front direction of the acoustic sensor 100, for example, the x-axis direction of FIG. 11.

Figure 19:
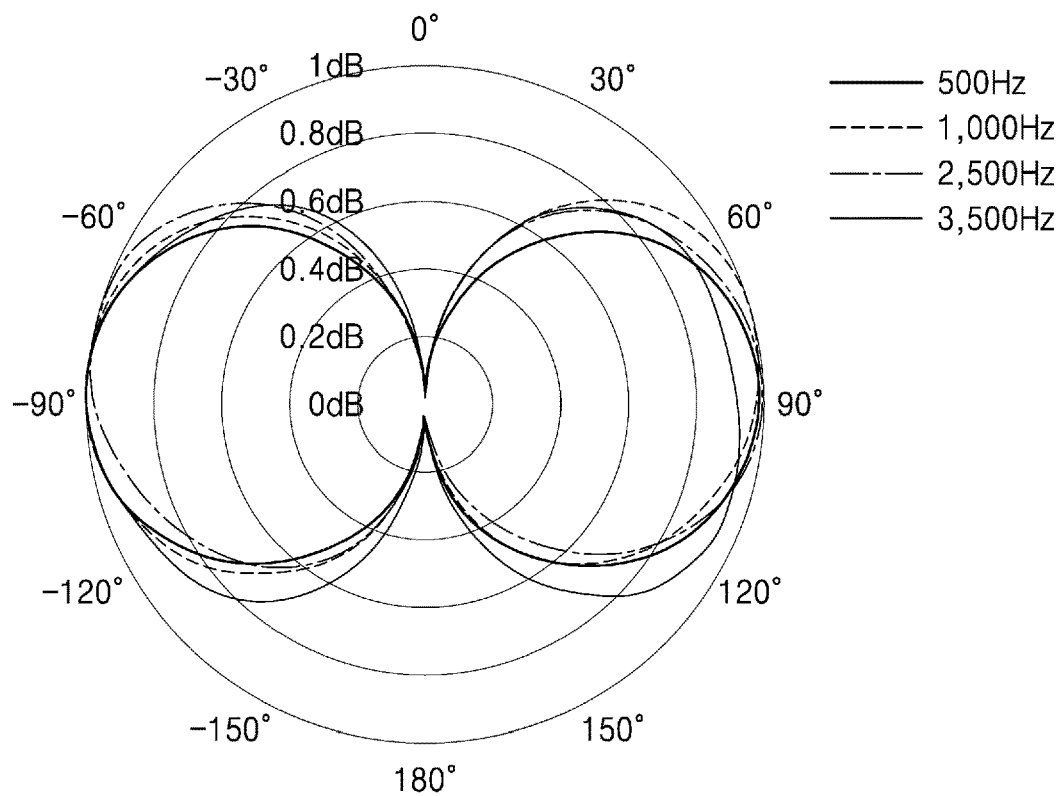
FIG. 19 is a view illustrating an experiment result of a directional characteristic obtained based on a difference between an output signal of a first directional acoustic sensor and an output signal of a second directional acoustic sensor in the acoustic sensor of FIG. 10.

FIG. 19 is a view illustrating an experiment result of a directional characteristic obtained by calculating the difference between the output signal of the first directional acoustic sensor 110 and the output signal of the second directional acoustic sensor 120 in the acoustic sensor 100 of FIG. 10. FIG. 19 illustrates the directional characteristic obtained based on the difference between the output signal of the first directional acoustic sensor 110 and the output signal of the second directional acoustic sensor 120. Referring to FIG. 19, it may be seen that a directional characteristic obtained by calculating the difference between the output signal of the first directional acoustic sensor 110 and the output signal of the second directional acoustic sensor 120 have directionality of the lateral direction of the acoustic sensor 100, for example, the y-axis direction of FIG. 11.

As described above, as the signal processor 150 calculates at least one of the sum of and the difference between the output signal of the first directional acoustic sensor 110 and the output signal of the second directional acoustic sensor 120, the acoustic sensor 100 may adjust the directional characteristic to have directionality in the front direction or the lateral direction based on a result of calculated sum and/or difference.

In the above description, when calculating the sum of or the difference between the output signal of the first directional acoustic sensor 110 and the output signal of the second directional acoustic sensor 120, a weight of 1 is applied to the output signal of the second directional acoustic sensor 120 and the output signal of the first directional acoustic sensor 110. However, the disclosure is not limited thereto, and a weight having any value other than 1 may be applied to the output signal of the second directional acoustic sensor 120 and/or to the output signal of the first directional acoustic sensor 110.

In an example embodiment, the output signals of the first directional acoustic sensor 110 and the second directional acoustic sensor 120 are G1 and G2, respectively, and a weight value of k may be applied to the output signal G2 of the second directional acoustic sensor 120. In this case, the signal processor 150 may calculate the sum of the output signal G1 of the first directional acoustic sensor 110 and the output signal G2 of the second directional acoustic sensor 120 by using a mathematical expression G1+kG2, and the difference between the output signal G1 of the first directional acoustic sensor 110 and the output signal G2 of the second directional acoustic sensor 120 by using a mathematical expression G1−kG2. Accordingly, as described below, the directional characteristic may be adjusted such that the acoustic sensor 100 has directionality in a desired direction.

In another example embodiment, a weight value of k may be applied to the output signal G1 of the first directional acoustic sensor 110. In this case, the signal processor 150 may calculate the sum of the output signal G1 of the first directional acoustic sensor 110 and the output signal G2 of the second directional acoustic sensor 120 by using a mathematical expression kG1+G2, and the difference between the output signal G1 of the first directional acoustic sensor 110 and the output signal G2 of the second directional acoustic sensor 120 by using a mathematical expression kG1−G2. Accordingly, as described below, the directional characteristic may be adjusted such that the acoustic sensor 100 has directionality in a desired direction.

FIGS. 20A to 20E are views illustrating the directional characteristic obtained by calculating the sum of or the difference between the output signal G1 of the first directional acoustic sensor and the output signal G2 of the second directional acoustic sensor according to a weight k of the output signal G2 of the second directional acoustic sensor and/or the output signal G1 of the first directional acoustic sensor in the acoustic sensor 100 of FIG. 10.

Figure 20A:
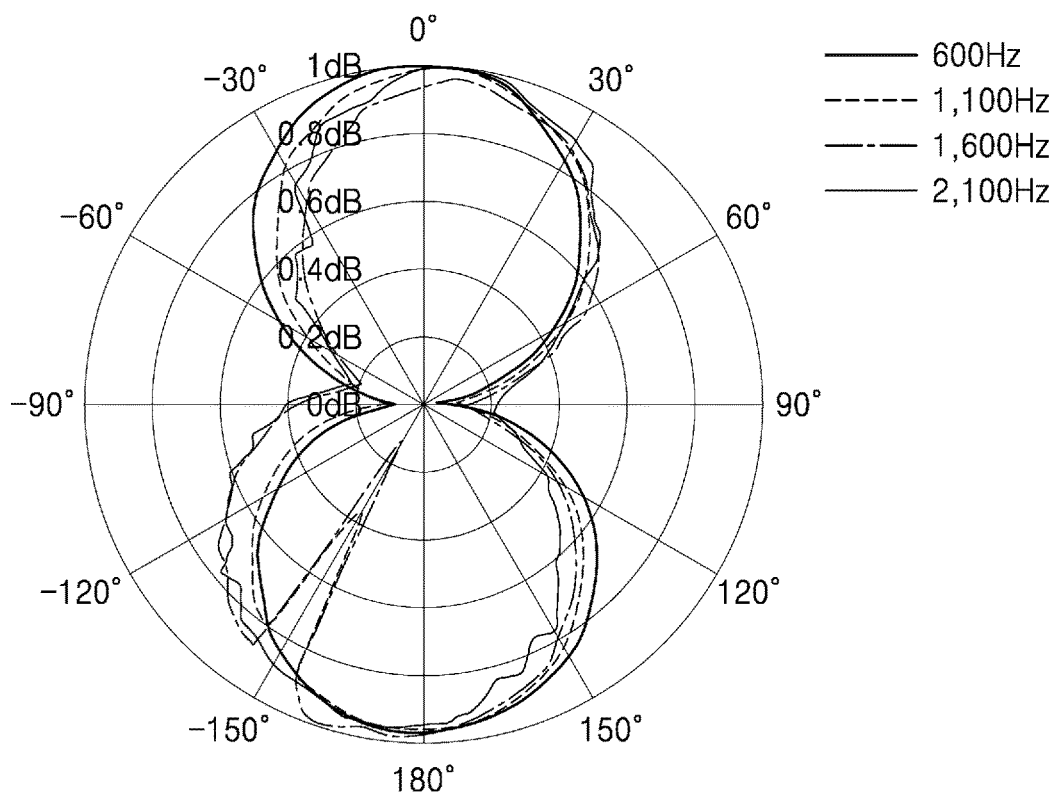
FIGS. 20A, 20B, 20C, 20D, and 20E are views illustrating directional characteristic obtained based on a sum of or a difference between an output signal of a first directional acoustic sensor and an output signal of a second directional acoustic sensor by applying a weight.

FIG. 20A illustrates the directional characteristic obtained when the weight k of the output signal G2 of the second directional acoustic sensor 120 is 1 in the above-described mathematical expression G1+kG2, indicating the sum of the output signal G1 of the first directional acoustic sensor 110 and the output signal G2 of the second directional acoustic sensor 120. In this case, the acoustic sensor 100 may have directionality in the front direction, for example, the x-axis direction of FIG. 11.

Figure 20B:
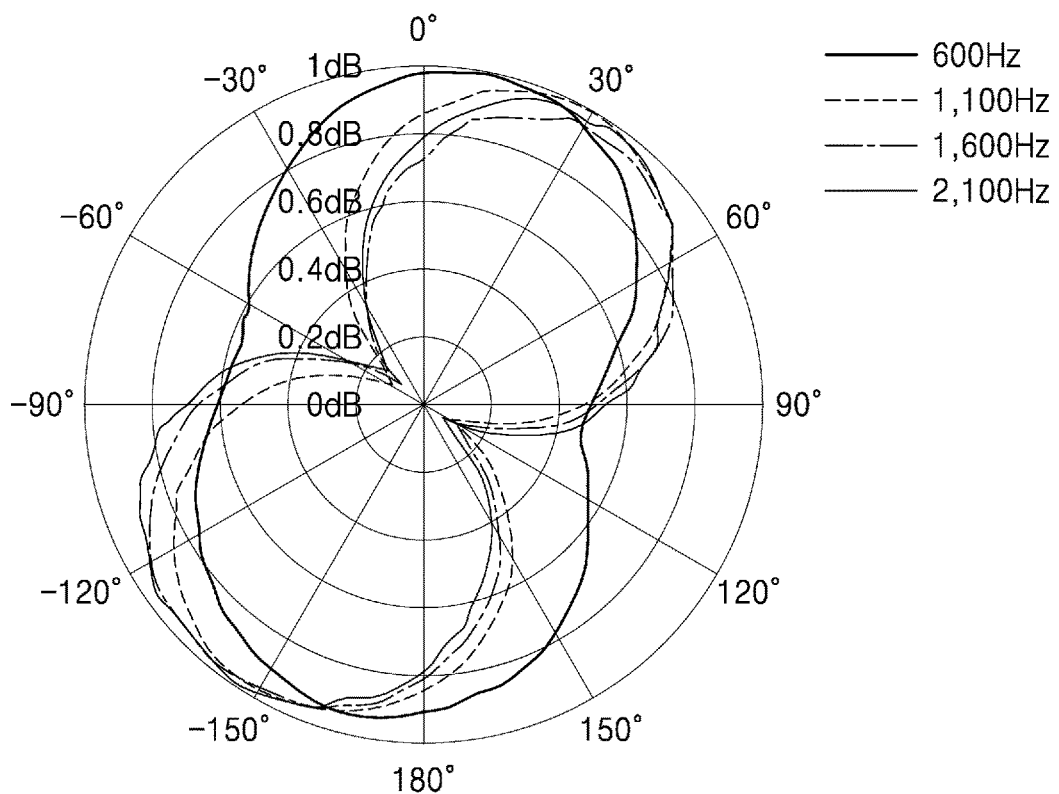
Figure 20C:
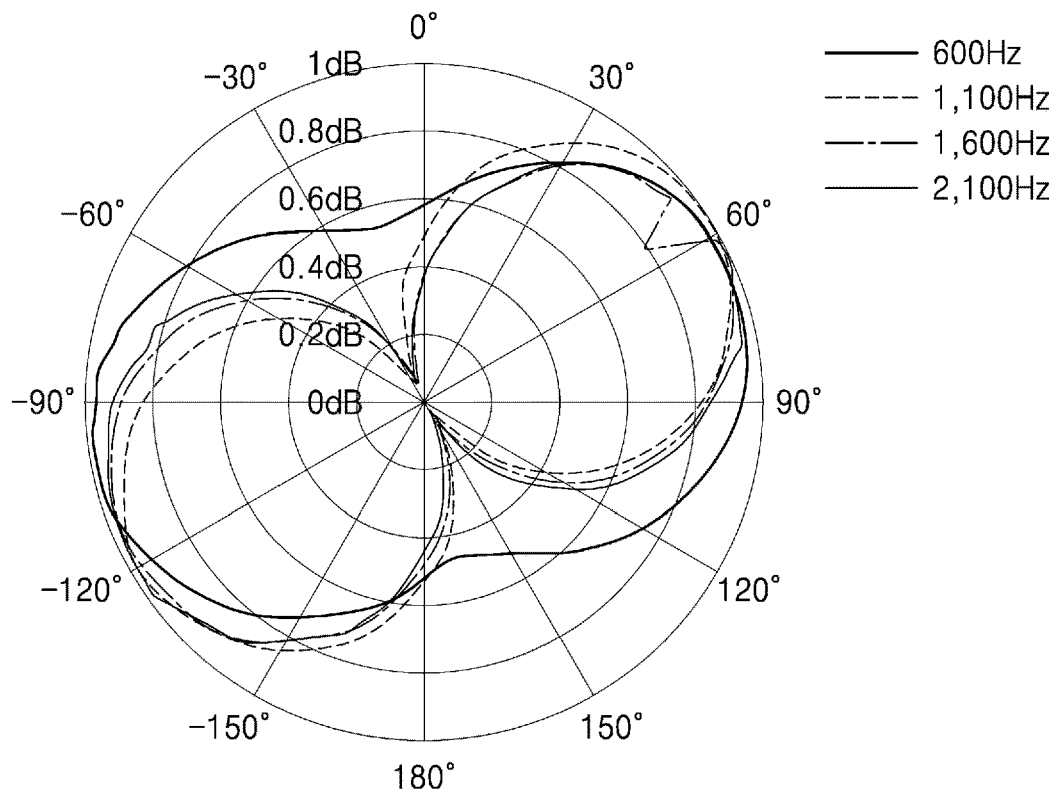

FIG. 20B illustrates the directional characteristic obtained when the weight k of the output signal G1 of the first directional acoustic sensor 110 is 0.5 in the above-described mathematical expression kG1+G2, indicating the sum of the weighted output signal G1 of the first directional acoustic sensor 110 and the output signal G2 of the second directional acoustic sensor 120. FIG. 20C illustrates the directional characteristic obtained when the weight k of the output signal G1 of the first directional acoustic sensor 110 is 0 in the above-described mathematical expression kG1+G2, indicating the sum of the weighted output signal G1 of the first directional acoustic sensor 110 and the output signal G2 of the second directional acoustic sensor 120.

Figure 20D:
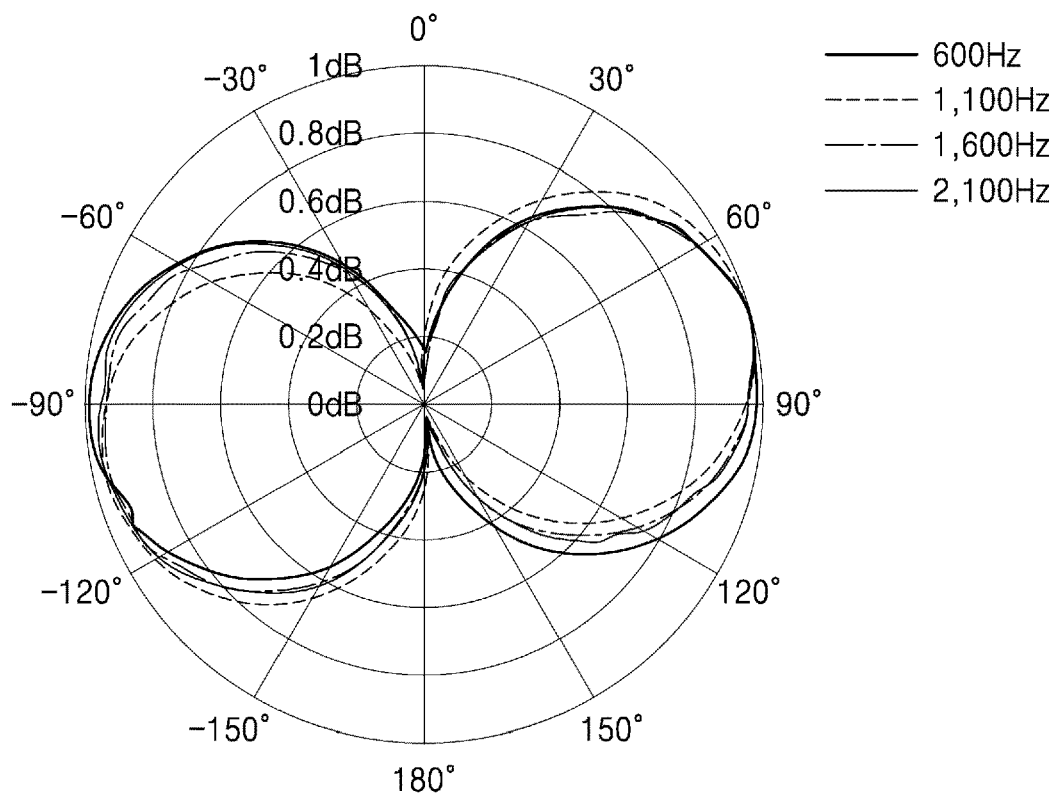

FIG. 20D illustrates the directional characteristic obtained when the weight k of the output signal G1 of the first directional acoustic sensor 110 is 0.5 in the above-described mathematical expression kG1−G2, indicating the difference between the weighted output signal G1 of the first directional acoustic sensor 110 and the output signal G2 of the second directional acoustic sensor 120.

Figure 20E:
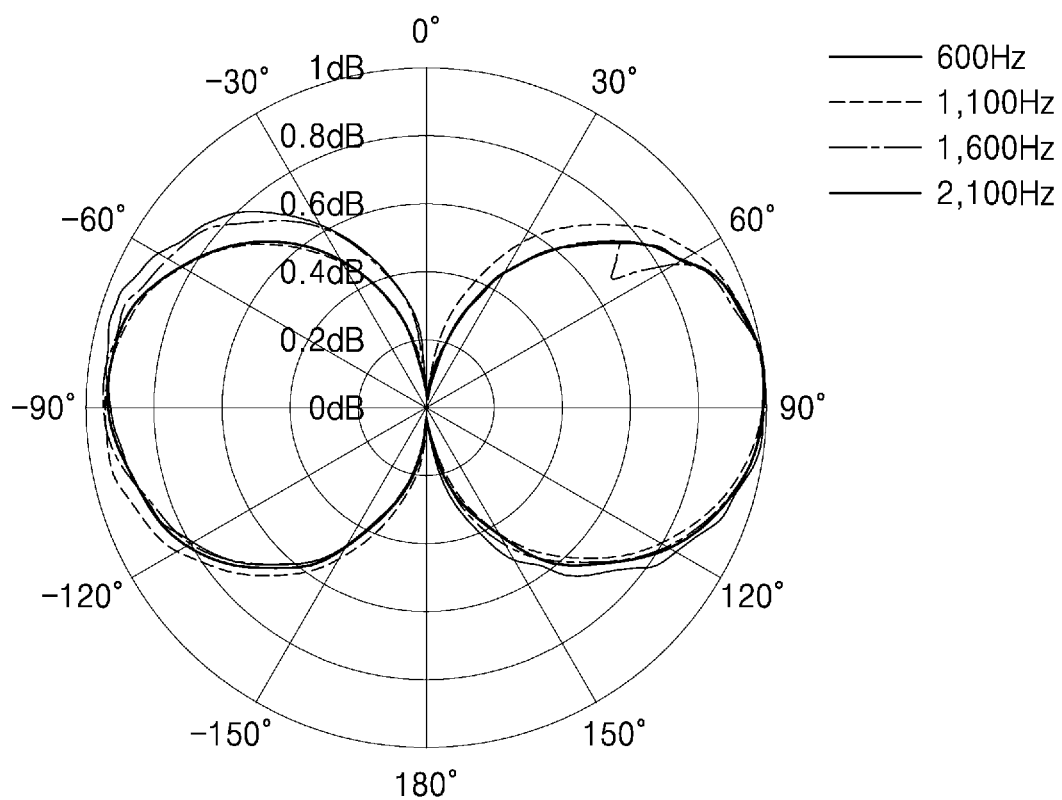

FIG. 20E illustrates the directional characteristic obtained when the weight k of the output signal G2 of the second directional acoustic sensor 120 is 1 in the above-described mathematical expression G1−kG2, indicating the difference between the output signal G1 of the first directional acoustic sensor 110 and the weighted output signal G2 of the second directional acoustic sensor 120. In this case, it may be seen that the acoustic sensor 100 has directionality in the lateral direction, for example, the y-axis direction of FIG. 11.

As described above, as the signal processor 150 calculates the sum of or the difference between the output signal G1 of the first directional acoustic sensor 110 and the output signal G2 of the second directional acoustic sensor 120, and adjusts in the calculation the weight k of the output signal G2 of the second directional acoustic sensor 120 and/or the output signal G1 of the first directional acoustic sensor 110, the acoustic sensor 100 having directionality in a direction desired by a user may be implemented.

A case in which the acoustic sensor 100 includes the two directional acoustic sensors 110 and 120 arranged to have directionalities different from one another is described in the above. However, the disclosure is not limited thereto, and it is possible that the acoustic sensor 100 includes three or more resonance unit arranged to have directionalities different from one another.

As described above, an acoustic signal directed in a particular direction may be generated by in the first sound source SP1 and the second sound source SP2. Furthermore, the acoustic sensor 100 may obtain directionality in a particular direction as the signal processor 150 calculates at least one of the sum of and the difference between the output signals of the first directional acoustic sensor 110 and the second directional acoustic sensor 120, by applying a certain weight. Accordingly, the acoustic signals generated by the first sound source SP1 and the second sound source SP2 and directed in a particular direction may be reflected from the first reflection surface 51 and the second reflection surface 52 in the room 50 and then received by the acoustic sensor 100 directed in the particular direction.

The calculation processor 160 may calculate a distance between the acoustic sensor 100 and the first reflection surface 51 according to a particular direction by measuring a time, that is, the time of flight (TOF), for the acoustic signals to arrive at the acoustic sensor 100 directed in the particular direction after being generated by the first sound source SP1 and the second sound source SP2, directed in the particular direction and then reflected from the first reflection surface 51, and multiplying the time by ½ of the speed of sound. Similarly, the calculation processor 160 may calculate a distance between the acoustic sensor 100 and the second reflection surface 52 according to the particular direction by multiplying the speed of sound by half of the time, that is, the time of flight (TOF), for the acoustic signals to arrive at the acoustic sensor 100 directed in the particular direction after being generated by the first sound source SP1 and the second sound source SP2, directed in the particular direction and then reflected from the second reflection surface 52.

In the following description, a method of measuring the size of the room 50 by using a distance measurement system 1000 according to an example embodiment is described with reference to FIG. 5.

The width D1 in the front direction (e.g., x-axis direction) of the room 50 may be measured as follows.

An acoustic signal directed in the front direction (e.g., x-axis direction) is generated by using the first sound source SP1 and the second sound source SP2. The first sound source SP1 and the second sound source SP2 simultaneously generate the first acoustic signal M1 and the second acoustic signal M2, thereby generating an acoustic signal directed in the front direction.

The signal processor 150 may process the output signals of the first directional acoustic sensor 110 and the second directional acoustic sensor 120 so that the acoustic sensor 100 including the first directional acoustic sensor 110 and the second directional acoustic sensor 120 may obtain directionality in the front direction. In detail, based on calculation by the signal processor 150 of the sum of the output signal of the first directional acoustic sensor 110 and the output signal of the second directional acoustic sensor 120, the acoustic sensor 100 may obtain directionality in the front direction.

An acoustic signal directed in the front direction may be generated by the first sound source SP1 and the second sound source SP2, reflected from the first reflection surface 51, and received by the acoustic sensor 100 directed in the front direction. In this case, the calculation processor 160 may calculate the time for an acoustic signal to arrive at the acoustic sensor 100 directed in the front direction after being generated by the first sound source SP1 and the second sound source SP2, directed in the front direction and then reflected from the first reflection surface 51, and multiplying the time by ½ of the speed of sound. Accordingly, the width D1 in the front direction of the room 50 may be measured.

Figure 21A:
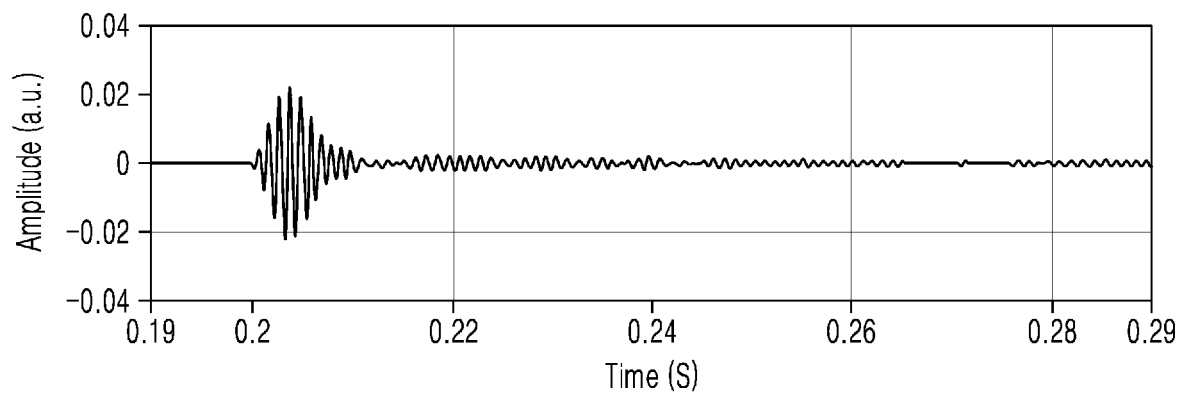
FIG. 21A is a graph showing a sensing signal received by an acoustic sensor directed in a front direction in the distance measurement system of FIG. 5 when acoustic signals are generated by a first sound source and a second sound source and directed in a front direction.
Figure 21B:
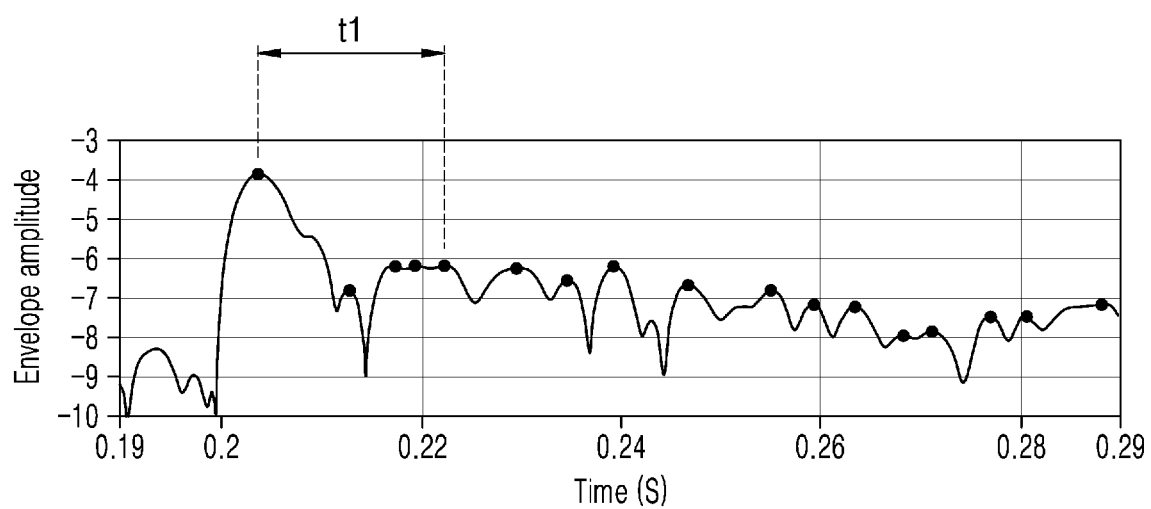
FIG. 21B is a graph of a peak envelope curve of the sensing signal of FIG. 21A.

FIGS. 21A and 21B illustrates a directional room transfer function (DRTF) by which an acoustic signal directed in the front direction is generated by the first sound source SP1 and the second sound source SP2 and the acoustic signal is obtainable by the acoustic sensor 100 directed in the front direction. FIG. 21A illustrates a sensing signal received by the acoustic sensor 100 directed in the front direction, and FIG. 21B illustrates a peak envelope curve of the sensing signal of FIG. 21A.

In FIGS. 21A and 21B, the calculation processor 160 may measure a time t1 for an acoustic signal generated by the first sound source SP1 and the second sound source SP2 and directed in the front direction to arrive at the acoustic sensor 100 directed in the front direction after being reflected from the first reflection surface 51. Then, by multiplying the time t1 by ½ of the speed of sound, a distance from the acoustic sensor 100 to the first reflection surface 51 may be measured.

Figure 22A:
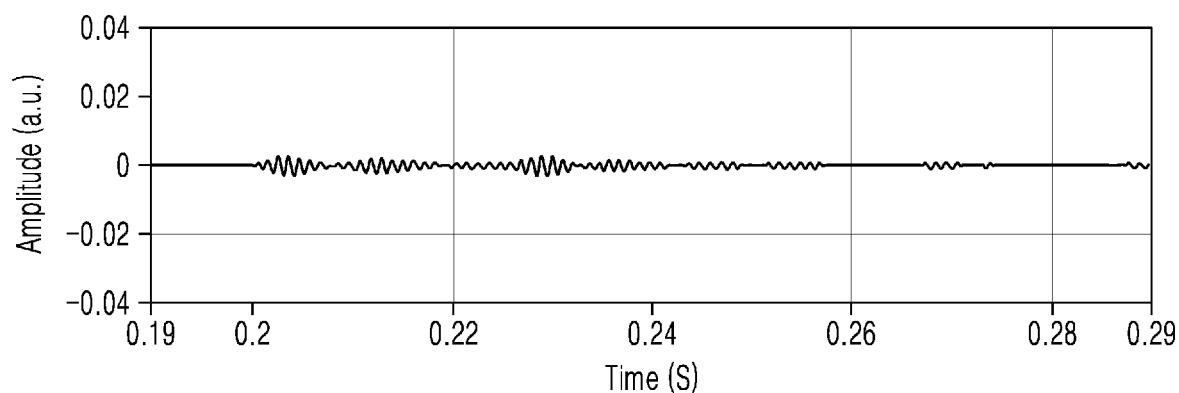
FIG. 22A is a graph showing a sensing signal received by an acoustic sensor directed in a lateral direction in the distance measurement system of FIG. 5 when acoustic signals are generated by a first sound source and a second sound source and directed in a front direction.
Figure 22B:
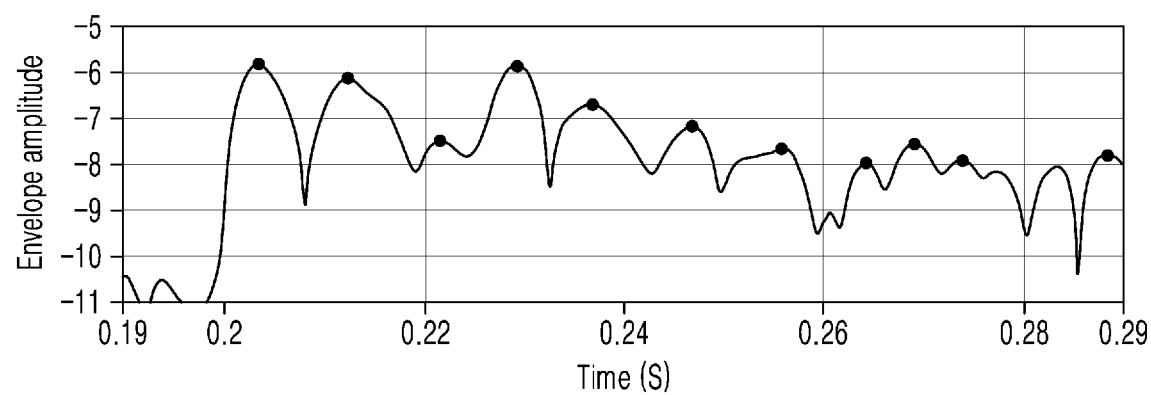
FIG. 22B is a graph of a peak envelope curve of the sensing signal of FIG. 22A.

FIGS. 22A and 22B illustrate the directional room transfer function (DRTF) by which an acoustic signal directed in the front direction is generated by the first sound source SP1 and the second sound source SP2, and the acoustic signal is obtainable by the acoustic sensor 100 directed in the lateral direction. The acoustic sensor 100 may obtain directionality in the lateral direction as the signal processor 150 calculates the difference between the output signal of the first directional acoustic sensor 110 and the output signal of the second directional acoustic sensor 120.

FIG. 22A illustrates a sensing signal received by the acoustic sensor 100 directed in the lateral direction, and FIG. 22B illustrates a peak envelope curve of the sensing signal of FIG. 22A. Referring to FIGS. 22A and 22B, it may be seen that the acoustic signal directed in the front direction is hardly received by the acoustic sensor 100 directed in the lateral direction.

The width D2 in the lateral direction (e.g., y-axis direction) of the room 50 may be measured as follows.

An acoustic signal directed in the lateral direction is generated by using the first sound source SP1 and the second sound source SP2. As the first sound source SP1 and the second sound source SP2 generate the first acoustic signal M1 and the second acoustic signal M2 with a certain delay time such that a phase difference of the first acoustic signal M1 and the second acoustic signal M2 is 90°, an acoustic signal directed in the lateral direction may be generated.

As the acoustic sensor 100 including the first directional acoustic sensor 110 and the second directional acoustic sensor 120 may obtain directionality in the lateral direction, the signal processor 150 may process the output signals of the first directional acoustic sensor 110 and the second directional acoustic sensor 120. In detail, as the signal processor 150 calculates the difference between the output signal of the first directional acoustic sensor 110 and the output signal of the second directional acoustic sensor 120, the acoustic sensor 100 may obtain directionality in the lateral direction.

The acoustic signal directed in the lateral direction generated by the first sound source SP1 and the second sound source SP2 and then reflected from the second reflection surface 52 may be received by the acoustic sensor 100 directed in the lateral direction. The calculation processor 160 may measure the time for the acoustic signal directed in the lateral direction generated by the first sound source SP1 and the second sound source SP2 to arrive at the acoustic sensor 100 directed in the lateral direction after being reflected from the second reflection surface 52, and then apply the time by ½ of the speed of sound, thereby calculating a distance from the acoustic sensor 100 to the second reflection surface 52. Accordingly, the width D2 in the lateral direction of the room 50 may be measured.

Figure 23A:
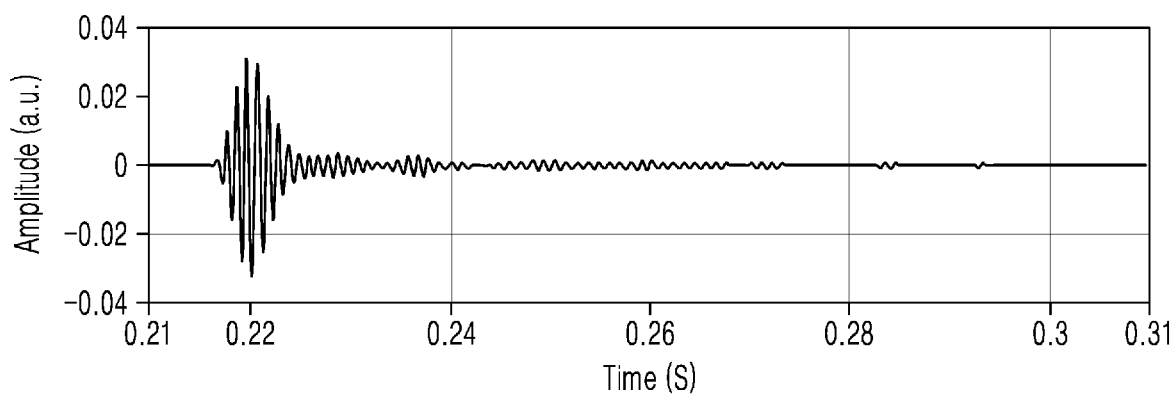
FIG. 23A is a graph showing a sensing signal received by an acoustic sensor directed in a lateral direction in the distance measurement system of FIG. 5 when acoustic signals are generated by a first sound source and a second sound source and directed in a lateral direction.
Figure 23B:
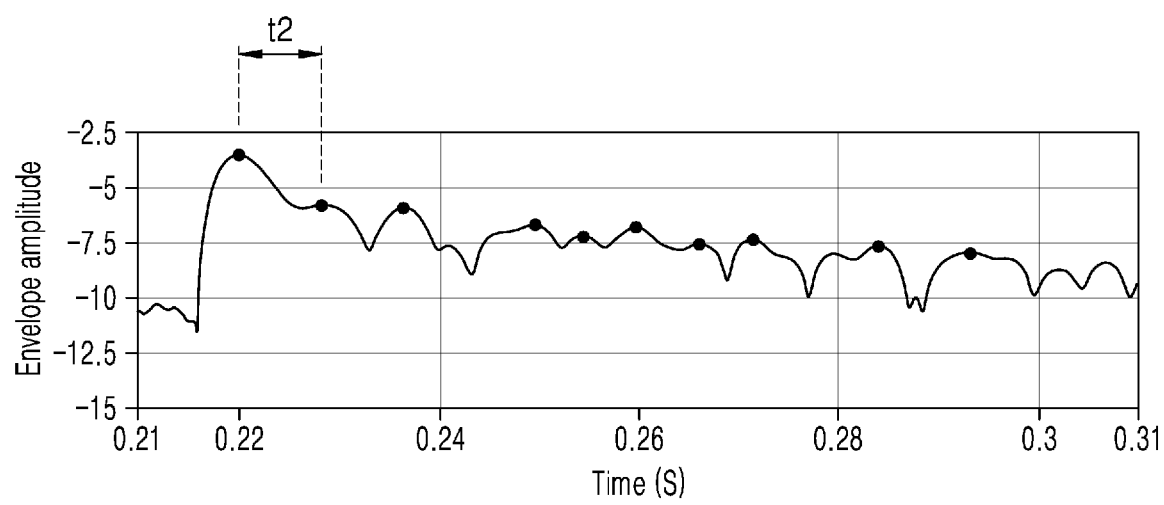
FIG. 23B is a graph of a peak envelope curve of the sensing signal of FIG. 23A.

FIGS. 23A and 23B illustrate the directional room transfer function (DRTF) by which an acoustic signal directed in the lateral direction is generated by the first sound source SP1 and the second sound source SP2, and the acoustic signal is obtainable by the acoustic sensor 100 directed in the lateral direction. FIG. 23A illustrates a sensing signal received by the acoustic sensor 100 directed in the lateral direction, and FIG. 23B illustrates a peak envelope curve of the sensing signal of FIG. 23A.

In FIGS. 23A and 23B, the calculation processor 160 may measure a time t2 for the acoustic signal directed in the lateral direction generated by the first sound source SP1 and the second sound source SP2 to arrive at the acoustic sensor 100 directed in the lateral direction after being reflected from the second reflection surface 52. Then, by multiplying the time t2 by ½ of the speed of sound, a distance from the acoustic sensor 100 to the second reflection surface 52 may be measured.

Figure 24A:
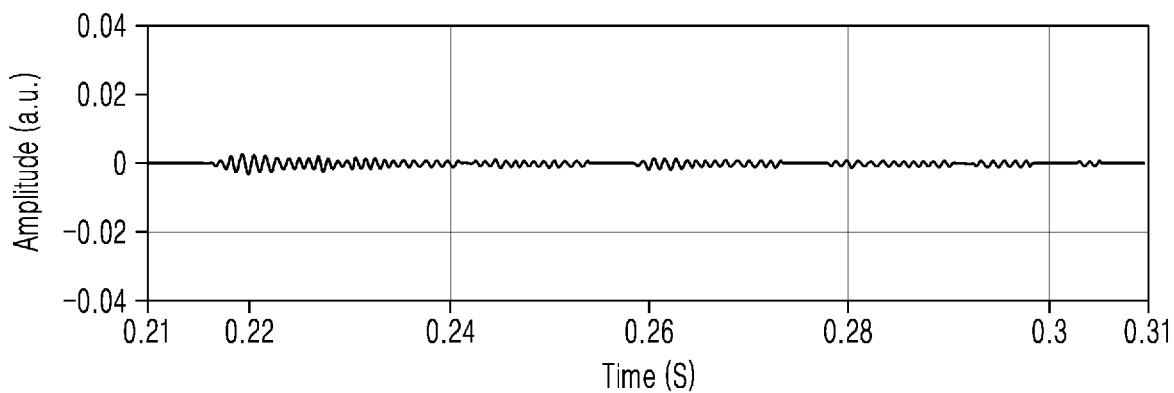
FIG. 24A is a graph showing a sensing signal received by an acoustic sensor directed in a front direction in the distance measurement system of FIG. 5 when acoustic signals are generated by a first sound source and a second sound source and directed in a lateral direction.
Figure 24B:
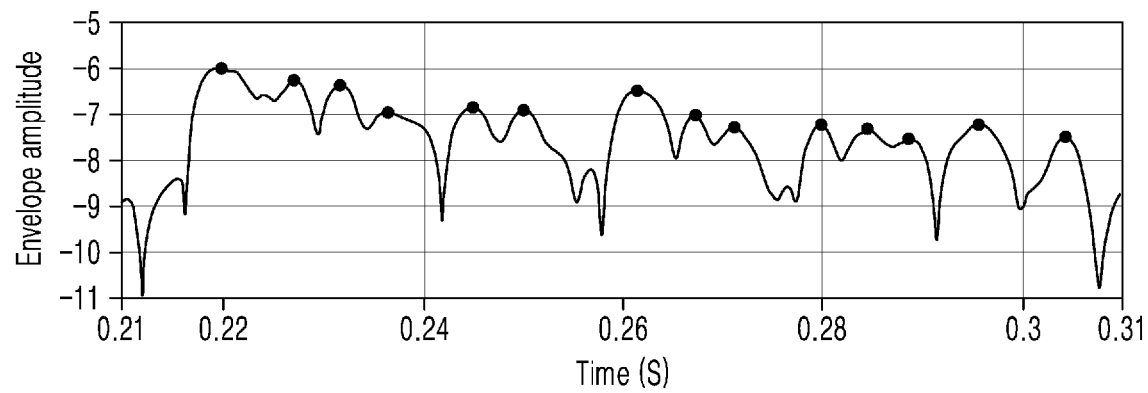
FIG. 24B is a graph of a peak envelope curve of the sensing signal of FIG. 24A.

FIGS. 24A and 24B illustrates the directional room transfer function (DRTF) by which an acoustic signal directed in the lateral direction is generated by the first sound source SP1 and the second sound source SP2, and the acoustic signal is obtainable by the acoustic sensor 100 directed in the front direction.

FIG. 24A illustrates a sensing signal received by the acoustic sensor 100 directed in the front direction, and FIG. 24B illustrates a peak envelope curve of the sensing signal of FIG. 24A. Referring to FIGS. 24A and 24B, it may be seen that the acoustic signal directed in the lateral direction is hardly received by the acoustic sensor 100 directed in the front direction.

As described above, the distance measurement system 1000 according to the example embodiment may obtain information about the size of the room 50 by measuring the width D1 in the front direction and the width D2 in the lateral direction. Although a case in which the distance measurement system 1000 measures the width D1 in the front direction and the width D2 in the lateral direction is described above, the distance measurement system 1000 may measure a width in other direction by adjusting the directionality of the acoustic sensor 100.

Although a case in which the distance measurement system 1000 measures a width in the front direction and a width in the lateral direction is described above, the height of the room 50 may be measured by adjusting the arrangement of the first directional acoustic sensor 110 and the second directional acoustic sensor 120 constituting the acoustic sensor 100 or increasing the number of directional acoustic sensors. The distance measurement system 1000 described above may be employed in various electronic apparatuses such as TVs, artificial intelligence (AI) speakers, and the like, to measure the size of a room.

Figure 25:
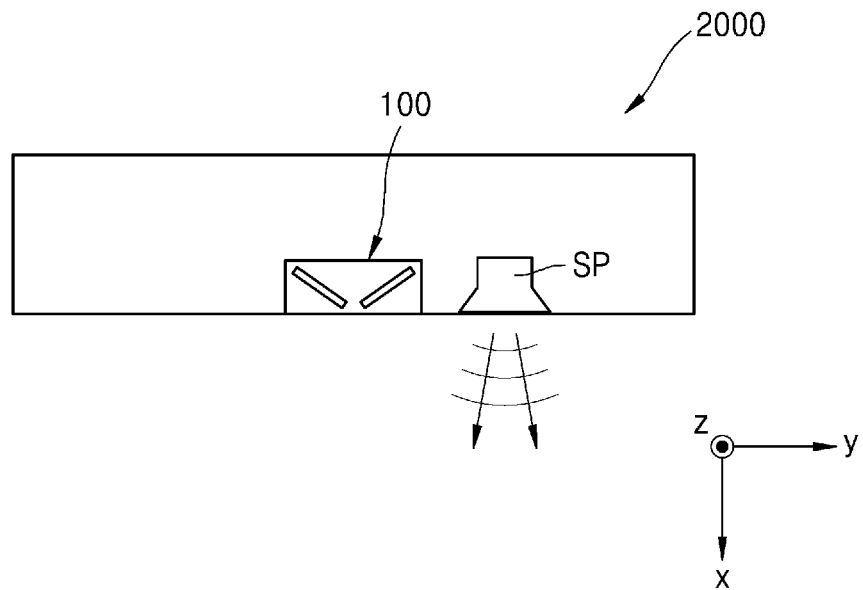
FIG. 25 is a view illustrating a distance measurement system according to an example embodiment.

FIG. 25 is a view illustrating a distance measurement system 2000 according to an example embodiment. The distance measurement system 2000 of FIG. 25 is substantially the same as the distance measurement system 1000 of FIG. 6, except that the distance measurement system 2000 of FIG. 25 includes one sound source SP.

Referring to FIG. 25, the distance measurement system 2000 may include the acoustic sensor 100 that includes the sound source SP and a plurality of directional acoustic sensors. The sound source SP may generate an omni-directional acoustic signal.

The acoustic sensor 100 may obtain directionality in a particular direction, as described above, as the signal processor 150 calculates at least one of the sum of and the difference between the output signals of the first directional acoustic sensor 110 and the second directional acoustic sensor 120, by applying a certain weight.

The distance measurement system 2000 according to an example embodiment may obtain information about the size of the room 50 even when the sound source SP generates an omni-directional acoustic signal. For example, when the acoustic sensor 100 obtains directionality in the front direction, an acoustic sensor receives an acoustic signal proceeding in the front direction of the omni-directional acoustic signal generated by the sound source SP, and a distance in the front direction may be measured. Furthermore, when the acoustic sensor 100 obtains directionality in the lateral direction, an acoustic sensor receives an acoustic signal proceeding in the lateral direction of the omni-directional acoustic signal generated by the sound source SP, and a distance in the lateral direction may be measured.

As described below, by using the distance measurement systems 1000 and 2000, a change in the room 50, for example, when an object reflecting or absorbing an acoustic signal is newly located between the acoustic sensor 100 and the first reflection surface 51 and the second reflection surface 52, or the position of the object is changed, may be detected.

Figure 26A:
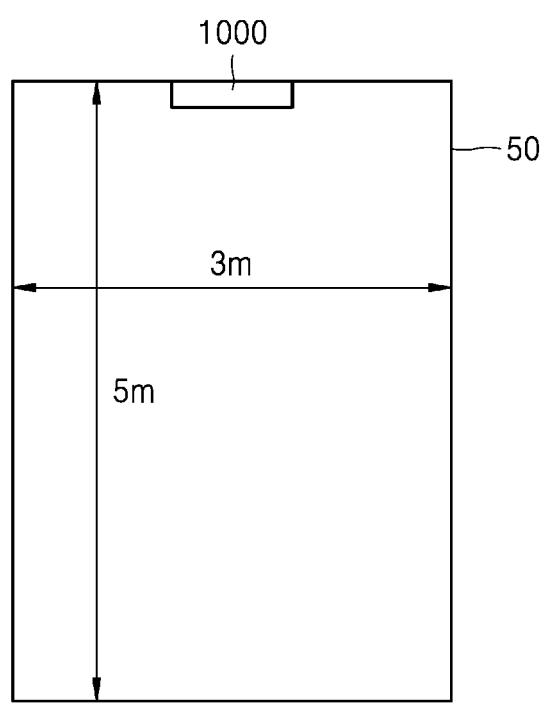
FIGS. 26A, 26B, and 26C are views illustrating various examples in which a distance measurement system according to an example embodiment is arranged.
Figure 26B:
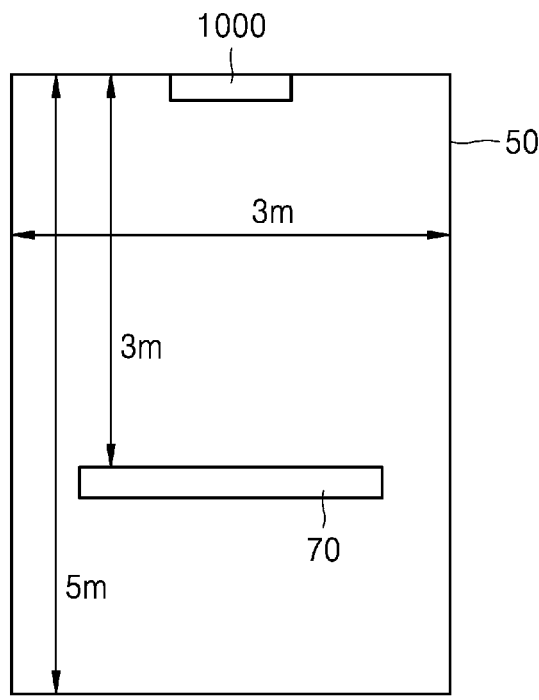
Figure 26C:
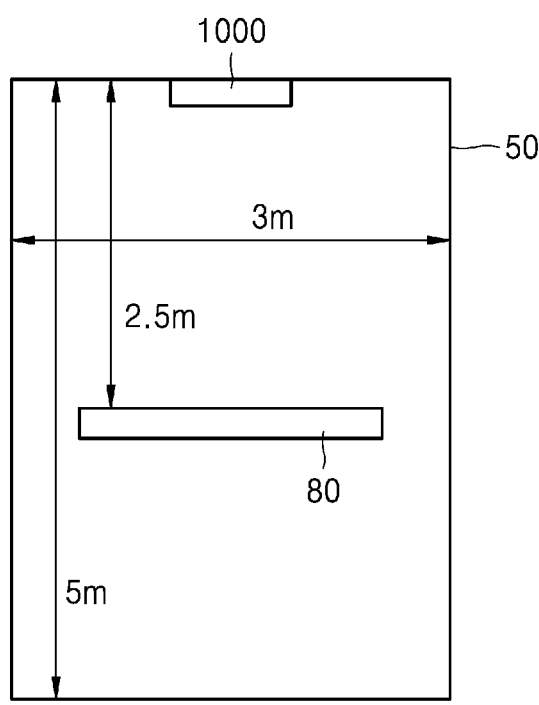

FIG. 26A is a view illustrating a case in which an object capable of reflecting or absorbing an acoustic signal is newly located, or the position of the object is changed, and FIGS. 26B and 26C is a view illustrating a case in which there is a change in the room (e.g., when a first object 70 is located in the room, or when a second object 80 is located in the room).

Referring to FIGS. 26A to 26C, the distance measurement system 1000 may be provided on one side wall of the room 50, and the distance measurement system 1000 may be located at a central portion with respect to a lateral direction. The distance measurement system 1000 may be, for example, the distance measurement system 1000 of FIG. 5. However, the disclosure is not limited thereto, and the distance measurement system 2000 of FIG. 25 may be used.

The room 50 has a width of 5 m in the front direction of the distance measurement system 1000 and a width of 3 m in the lateral direction. The first object 70 illustrated in FIG. 26B is located at a position 3 m away from the distance measurement system 1000 in the front direction, and the second object 80 illustrated in FIG. 26C is located at a position 2.5 m away from the distance measurement system 1000 in the front direction.

Figure 27A:
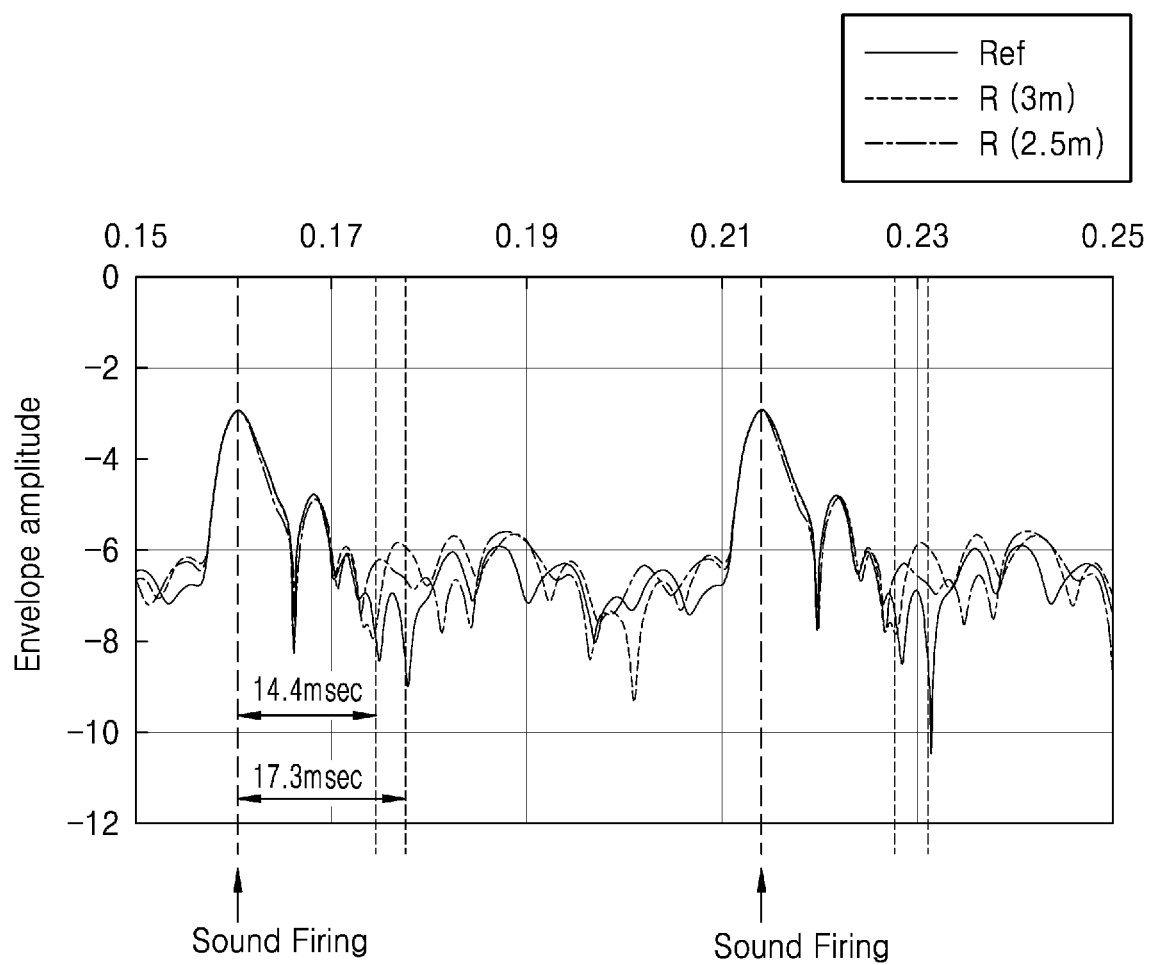
FIG. 27A is a graph of a directional room transfer function (DRTF) received by an acoustic sensor directed in a front direction according to an example embodiment in each of examples of FIGS. 26A, 26B, and 26C.

FIG. 27A is a graph of a directional room transfer function (DRTF) received by the acoustic sensor directed in the front direction and obtained in each of FIGS. 26A, 26B, and 26C. In FIG. 27A, "Ref" denotes, as illustrated in FIG. 26A, the directional room transfer function (DRTF) obtained when no object is arranged in the room 50, "R (3 m)" denotes, as illustrated in FIG. 26B, the directional room transfer function (DRTF) obtained when the first object 70 is 3 m away from the distance measurement system 1000 in the front direction in the room 50, and "R (2.5 m)" denotes, as illustrated in FIG. 26C, the directional room transfer function (DRTF) obtained when the second object 80 is located 2.5 m away from the distance measurement system 1000 in the front direction in the room 50.

Figure 27B:
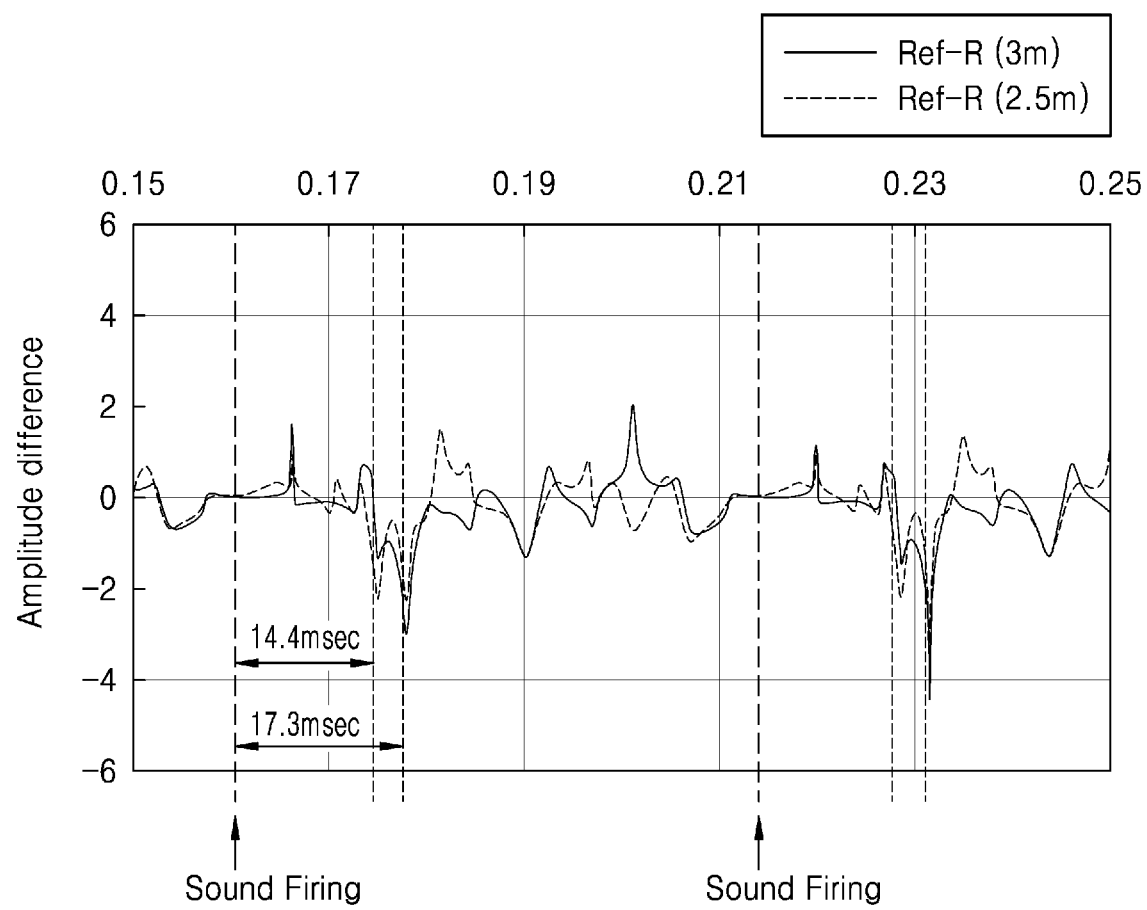
FIG. 27B is a graph showing a difference between directional room transfer functions received by an acoustic sensor directed in a front direction in examples of FIGS. 26A and 26B, and a difference between directional room transfer functions received by an acoustic sensor directed in a front direction in examples of FIGS. 26A and 26C.

FIG. 27B is a graph showing a difference between the directional room transfer functions (DRTF) obtained in FIGS. 26A and 26B and received by the acoustic sensor directed in the front direction and a difference between the directional room transfer functions (DRTF) obtained in FIGS. 26A and 26C and received by the acoustic sensor directed in the front direction.

Referring to FIGS. 27A and 27B, it may be seen that there is a change in the directional room transfer function (DRTF) when the object 70 or 80 reflecting an acoustic signal is arranged in the room 50, compared with a case in which no object is arranged in the room 50. In detail, when comparing Ref with R (3 m), it may be detected that the first object 70 is about 3 m away from the distance measurement system 1000 in the front direction. Furthermore, when comparing Ref with R (2.5 m), it may be detected that the second object 80 is about 2.5 m away from the distance measurement system 1000 in the front direction.

By measuring a change in the directional room transfer function (DRTF) by using the distance measurement system 1000, a change in the room 50, for example, that the object capable of reflecting or absorbing an acoustic signal is newly located in the room 50 or the position of the object is changed, and the like may be detected.

As described above, the distance measurement system according to an example embodiment may obtain information about the size of a room by calculating the TOF of an acoustic signal by receiving the acoustic signal proceeding in a particular direction by using an acoustic sensor directed in a particular direction. Furthermore, the distance measurement system may detect a change in the room, for example, when an object capable of reflecting or absorbing an acoustic signal is newly located in a room or the position of the object is changed, and the like, by measuring a change in the directional room transfer function. Although the example embodiments have been described above, these are merely examples, and various modifications may be made therefrom by those of ordinary skill in the art.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A distance measurement system, comprising:
   a plurality of sound sources comprising a first sound source and a second sound source spaced apart from each other, the first sound source and the second sound source being configured to generate a plurality of acoustic signals;
   an acoustic sensor interposed between the first sound source and the second sound source, the acoustic sensor comprising a first directional acoustic sensor and a second directional acoustic sensor arranged symmetrically with respect to each other relative to a front direction of the acoustic sensor and to be inclined at a certain angle with respect to the front direction of the acoustic sensor, wherein the first directional acoustic sensor and the second directional acoustic sensor are configured to generate output signals by sensing the plurality of acoustic signals generated by the first sound source and the second sound source, and the acoustic sensor has a bi-directionality in a particular direction based on directionalities of the first directional acoustic sensor and the second directional acoustic sensor;

a controller configured to control a phase difference between the plurality of acoustic signals generated by the plurality of sound sources by adjusting a delay time between the plurality of acoustic signals, wherein the plurality of acoustic signals have a directionality in a desired direction based on the controlled phase difference; and at least one processor configured to:
adjust the acoustic sensor to have a directional characteristic in the desired direction, that is different from the particular direction, based on at least one of an addition of the output signals of the first directional acoustic sensor and the second directional acoustic sensor or a subtraction between the output signals of the first directional acoustic sensor and the second directional acoustic sensor, the at least one of the addition or the subtraction being based on applying a weight to at least one of the output signals, wherein a value of the weight is adjusted to obtain the directional characteristic of the acoustic sensor in the desired direction, and determine a distance between the acoustic sensor and a reflection surface based on a time for an acoustic signal to arrive at the acoustic sensor in the desired direction after being generated and then reflected from the reflection surface, wherein a distance between the first sound source and the second sound source corresponds to one half of a wavelength of each of the first sound source and the second sound source.

2. The distance measurement system of claim 1, wherein each of the first sound source and the second sound source is configured to generate an omni-directional acoustic signal.

3. The distance measurement system of claim 1, wherein the at least one processor is further configured to apply the value of the weight of 1 to the output signals of the first directional acoustic sensor and the second directional acoustic sensor.

4. The distance measurement system of claim 3, wherein the at least one processor is further configured to adjust the acoustic sensor to have a directional characteristic in a first direction based on a result of the addition, and configured to adjust the acoustic sensor to have a directional characteristic in a second direction, the second direction being perpendicular to the first direction, based on a result of the subtraction.

5. The distance measurement system of claim 4, wherein the at least one processor to, based on the acoustic sensor having the directional characteristic in the first direction, determine a first distance in the first direction between the acoustic sensor and the reflection surface, and based on the acoustic sensor having the directional characteristic in the second direction, determine a second distance in the second direction between the acoustic sensor and the reflection surface.

6. The distance measurement system of claim 1, wherein the at least one processor is further configured to apply different weights to the output signals of the first directional acoustic sensor and the second directional acoustic sensor.

7. The distance measurement system of claim 1, wherein the at least one processor is further configured to, based on a change in a room transfer function (RTF) in the desired direction obtained from the acoustic sensor, detect at least one of a position of a first object newly located between the acoustic sensor and the reflection surface or a changed position of a second object between the acoustic sensor and the reflection surface.

8. The distance measurement system of claim 1, wherein each of the first directional acoustic sensor and the second directional acoustic sensor comprises:
a support; and
a plurality of resonators extending from the support.

9. The distance measurement system of claim 8, wherein the plurality of resonators have resonance frequencies different from one another.

10. The distance measurement system of claim 1, wherein the output signals comprise a first output signal and a second output signal,
wherein to perform the addition, the at least one processor is further configured to add the first output signal and the second output signal, and
wherein to perform the subtraction, the at least one processor is further configured to subtract the second output signal from the first output signal.

11. An electronic apparatus comprising:
a plurality of sound sources comprising a first sound source and a second sound source spaced apart from each other, the first sound source and the second sound source being configured to generate a plurality of acoustic signals;
an acoustic sensor interposed between the first sound source and the second sound source, the acoustic sensor comprising a first directional acoustic sensor and a second directional acoustic sensor arranged symmetrically with respect to each other relative to a front direction of the acoustic sensor and to be inclined at a certain angle with respect to the front direction of the acoustic sensor, wherein the first directional acoustic sensor and the second directional acoustic sensor are configured to generate output signals by sensing the plurality of acoustic signals generated by the first sound source and the second sound source, and the acoustic sensor has a bi-directionality in a particular direction based on directionalities of the first directional acoustic sensor and the second directional acoustic sensor;
a controller configured to control a phase difference between the plurality of acoustic signals generated by the plurality of sound sources by adjusting a delay time between the plurality of acoustic signals, wherein the plurality of acoustic signals have a directionality in a desired direction based on the controlled phase difference; and
at least one processor configured to:
adjust the acoustic sensor to have a directional characteristic in the desired direction, that is different from the particular direction, based on at least one of an addition of the output signals of the first directional acoustic sensor and the second directional acoustic sensor or a subtraction between the output signals of the first directional acoustic sensor and the second directional acoustic sensor, the at least one of the addition or the subtraction being based on applying a weight to at least one of the output signals, wherein a value of the weight is adjusted to obtain the directional characteristic of the acoustic sensor in the desired direction, and determine a distance between the acoustic sensor and a reflection surface based on a time for an acoustic signal to arrive at the acoustic sensor in the desired direction after being generated and then reflected from the reflection surface, wherein a distance between the first sound source and the second sound source corresponds to one half of a wavelength of each of the first sound source and the second sound source.

12. A distance measurement method, comprising:

generating a plurality of acoustic signals in a plurality of sound sources comprising a first sound source and a second sound source spaced apart from each other;

receiving an acoustic signal by an acoustic sensor, the acoustic sensor being interposed between the first sound source and the second sound source, the acoustic sensor comprising a first directional acoustic sensor and a second directional acoustic sensor arranged symmetrically with respect to each other relative to a front direction of the acoustic sensor and to be inclined at a certain angle with respect to the front direction of the acoustic sensor, wherein the first directional acoustic sensor and the second directional acoustic sensor are configured to generate output signals by sensing the plurality of acoustic signals generated by the first sound source and the second sound source, and the acoustic sensor has a bi-directionality in a particular direction based on directionalities of the first directional acoustic sensor and the second directional acoustic sensor;

controlling a phase difference between the plurality of acoustic signals generated by the plurality of sound sources by adjusting a delay time between the plurality of acoustic signals, wherein the plurality of acoustic signals have a directionality in a desired direction based on the controlled phase difference;

adjusting the acoustic sensor to have a directional characteristic in the desired direction, that is different from the particular direction, based on at least one of an addition of the output signals of the first directional acoustic sensor and the second directional acoustic sensor or a subtraction between the output signals of the first directional acoustic sensor and the second directional acoustic sensor, the at least one of the addition or the subtraction being based on applying a weight to at least one of the output signals, wherein a value of the weight is adjusted to obtain the directional characteristic of the acoustic sensor in the desired direction; and determining a distance between the acoustic sensor and a reflection surface based on a time for the acoustic signal to arrive at the acoustic sensor in the desired direction after being generated and then reflected from the reflection surface, wherein a distance between the first sound source and the second sound source corresponds to one half of a wavelength of each of the first sound source and the second sound source.

13. The distance measurement method of claim 12, wherein the applying the weight comprises applying the value of the weight of 1 to the output signals of the first directional acoustic sensor and the second directional acoustic sensor.

14. The distance measurement method of claim 13, wherein the adjusting and the determining the distance comprises adjusting the acoustic sensor to have a directional characteristic in a first direction based on a result of the addition and determining a first distance in the first direction between the acoustic sensor and the reflection surface.

15. The distance measurement method of claim 13, wherein the adjusting and the determining the distance comprise adjusting the acoustic sensor to have a directional characteristic in a second direction based on the subtraction between the output signals of the first directional acoustic sensor and the second directional acoustic sensor and determining a second distance in the second direction between the acoustic sensor and the reflection surface.

16. The distance measurement method of claim 12, wherein the applying the weight comprises applying different weights to the output signals of the first directional acoustic sensor and the second directional acoustic sensor.

17. The distance measurement method of claim 12, further comprising detecting, based on a change in a room transfer function (RTF) in the desired direction obtained from the acoustic sensor, at least one of a position of a first object newly located between the acoustic sensor and the reflection surface or a changed position of a second object between the acoustic sensor and the reflection surface.

* * * * *